United States Patent
Inoue et al.

(10) Patent No.: US 7,945,864 B2
(45) Date of Patent: May 17, 2011

(54) OPERATION ASSISTING APPARATUS AND OPERATION ASSISTING METHOD

(75) Inventors: Tsuyoshi Inoue, Nara (JP); Makoto Nishizaki, Tokyo (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 468 days.

(21) Appl. No.: 12/159,348

(22) PCT Filed: Oct. 29, 2007

(86) PCT No.: PCT/JP2007/071042
§ 371 (c)(1),
(2), (4) Date: Jun. 26, 2008

(87) PCT Pub. No.: WO2008/059710
PCT Pub. Date: May 22, 2008

(65) Prior Publication Data
US 2010/0229120 A1    Sep. 9, 2010

(30) Foreign Application Priority Data
Nov. 15, 2006  (JP) .................................. 2006-309566

(51) Int. Cl.
*G06F 11/00* (2006.01)
*G06F 17/30* (2006.01)

(52) U.S. Cl. ........ 715/811; 715/812; 707/737; 707/738; 707/739; 707/749

(58) Field of Classification Search .......... 715/810–827; 707/732, 737–739, 749, 751, E17.014
See application file for complete search history.

(56) References Cited

U.S. PATENT DOCUMENTS

| | | | |
|---|---|---|---|
| 6,751,621 B1 * | 6/2004 | Calistri-Yeh et al. .................. | 1/1 |
| 7,539,615 B2 * | 5/2009 | Koistinen et al. ............. | 704/226 |
| 7,716,216 B1 * | 5/2010 | Harik et al. .................... | 707/724 |

(Continued)

FOREIGN PATENT DOCUMENTS

EP    1 079 314    2/2001

(Continued)

OTHER PUBLICATIONS

International Search Report issued Jan. 22, 2008 in the International (PCT) Application of which the present application is the U.S. National Stage.

(Continued)

*Primary Examiner* — Tadeese Hailu
(74) *Attorney, Agent, or Firm* — Wenderoth, Lind & Ponack, L.L.P.

(57) ABSTRACT

An operation assisting apparatus includes: an option-function distance storage unit that stores a semantic distance between each of the options displayed on a menu screen and each of functions positioned at an end in the hierarchical structure; an operation history storage unit that stores the operation history of the options sequentially selected by the user; an estimation unit that estimates, based on a semantic distance between a selection option selected by the user and each of the functions, and a semantic distance between an unselected selection option that has been selectable but not selected and each of the functions, a degree of probability that the function is the function desired by the user; and an operational assistance determination unit that determines, based on the result of the estimation, a detail of an output such that functions with higher probability will be presented with higher precedence in selectability.

10 Claims, 19 Drawing Sheets

U.S. PATENT DOCUMENTS

| | | |
|---|---|---|
| 2002/0154171 A1* | 10/2002 | Lee et al. ............. 345/781 |
| 2004/0039657 A1* | 2/2004 | Behrens et al. ............. 705/26 |
| 2004/0220925 A1* | 11/2004 | Liu et al. ............. 707/3 |
| 2006/0212836 A1* | 9/2006 | Khushraj et al. ............. 715/866 |
| 2008/0115082 A1* | 5/2008 | Simmons et al. ............. 715/804 |
| 2009/0204386 A1* | 8/2009 | Seligman et al. ............. 704/2 |
| 2010/0138735 A1* | 6/2010 | Uematsu ............. 715/234 |

FOREIGN PATENT DOCUMENTS

| | | |
|---|---|---|
| JP | 62-182913 | 8/1987 |
| JP | 8-153004 | 6/1996 |
| JP | 11-231998 | 8/1999 |
| JP | 2000-227826 | 8/2000 |
| JP | 2000-231429 | 8/2000 |
| JP | 2001-67360 | 3/2001 |
| JP | 2003-345487 | 12/2003 |
| JP | 2005-165944 | 6/2005 |
| JP | 2006-164058 | 6/2006 |

OTHER PUBLICATIONS

Yogo Kaisetsu, "*Journal of Japan Society for Fuzzy Theory and Intelligent Informatics*", vol. 17, No. 1, pp. 76-77, Feb. 2005.

* cited by examiner

FIG. 5

| Word 1 | Word 2 | Semantic distance |
|--------|--------|-------------------|
| Program | Dubbing | 0.143 |
| Program | Recording | 0.123 |
| Program | Change | 0.105 |
| Program | Settings | 0.097 |
| Program | Stop | 0.044 |

FIG. 6

| Function No. 501 | Function name 502 | Function description 503 | Operational procedure 504 |
|---|---|---|---|
| 1 | Schedule recording by specifying date/time and channel | Method of scheduling by manually specifying designated channel, start time, etc. ⋯ | 1. Function selection → Recording → Program guide → Timer scheduling<br>2. Function selection → ⋯ |
| 2 | Search for program by genre and schedule recording | You can search for desired program by "genre" of program, and perform schedule recording of it | 1. Function selection → Recording → Search program guide → ⋯ |
| 3 | Dub combination of programs | Programs (titles) in "Video DR" list can be dubbed onto only CPRM-compliant DVD-RAM or DVD-R (VR system) ⋯ | 1. Function selection → Dubbing |
| 4 | Edit program title | 1. Press "Playback navi" during playback or stop.<br>2. Press "Red" or "Blue" button and "Video" ⋯ | 1. Playback navi → Submenus → Edit title |
| 5 | Adjust clock time | This device acquires information sent from digital broadcasting, and automatically adjusts time, and so normally ⋯ | 1. Function selection → Other function → Placement setting |

FIG. 7

| Management No. | Selection option name | Function name | Option-function distance |
|---|---|---|---|
| 1 | Function selection | Schedule recording by specifying date/time and channel | 0.60 |
| 2 | Playback navi | Schedule recording by specifying date/time and channel | 0.15 |
| 3 | Program guide | Schedule recording by specifying date/time and channel | 0.40 |
| 4 | Dubbing | Schedule recording by specifying date/time and channel | 0.10 |
| 5 | Other functions | Schedule recording by specifying date/time and channel | 0.25 |

| History No. | Date/time at time of selection | Selection option pending time | Displayed screen name | Selected option | Other candidates for selection |
|---|---|---|---|---|---|
| 1 | 2006/8/26 10:23:00.00 | 03.05[s] | Top screen | Function selection | Playback navi   Program guide   HDD/DVD ... |
| 2 | 2006/8/26 10:23:02.35 | 02.35[s] | Function selection screen | Scheduled recording | Playback navi   Dubbing   Other functions ... |
| 3 | 2006/8/26 10:23:12.35 | 10.00[s] | Scheduled recording screen | Recording settings | Schedule with program guide   Check schedule ... |
| 4 | 2006/8/26 10:23:15.15 | 02.40[s] | Recording settings screen | Back | Mode setting   Sound settings   Just Recording ... |
| 5 | 2006/8/26 10:23:31.15 | 16.00[s] | Scheduled recording screen | Help | Schedule with program guide   Check schedule ... |

701  702  703  704  705  706

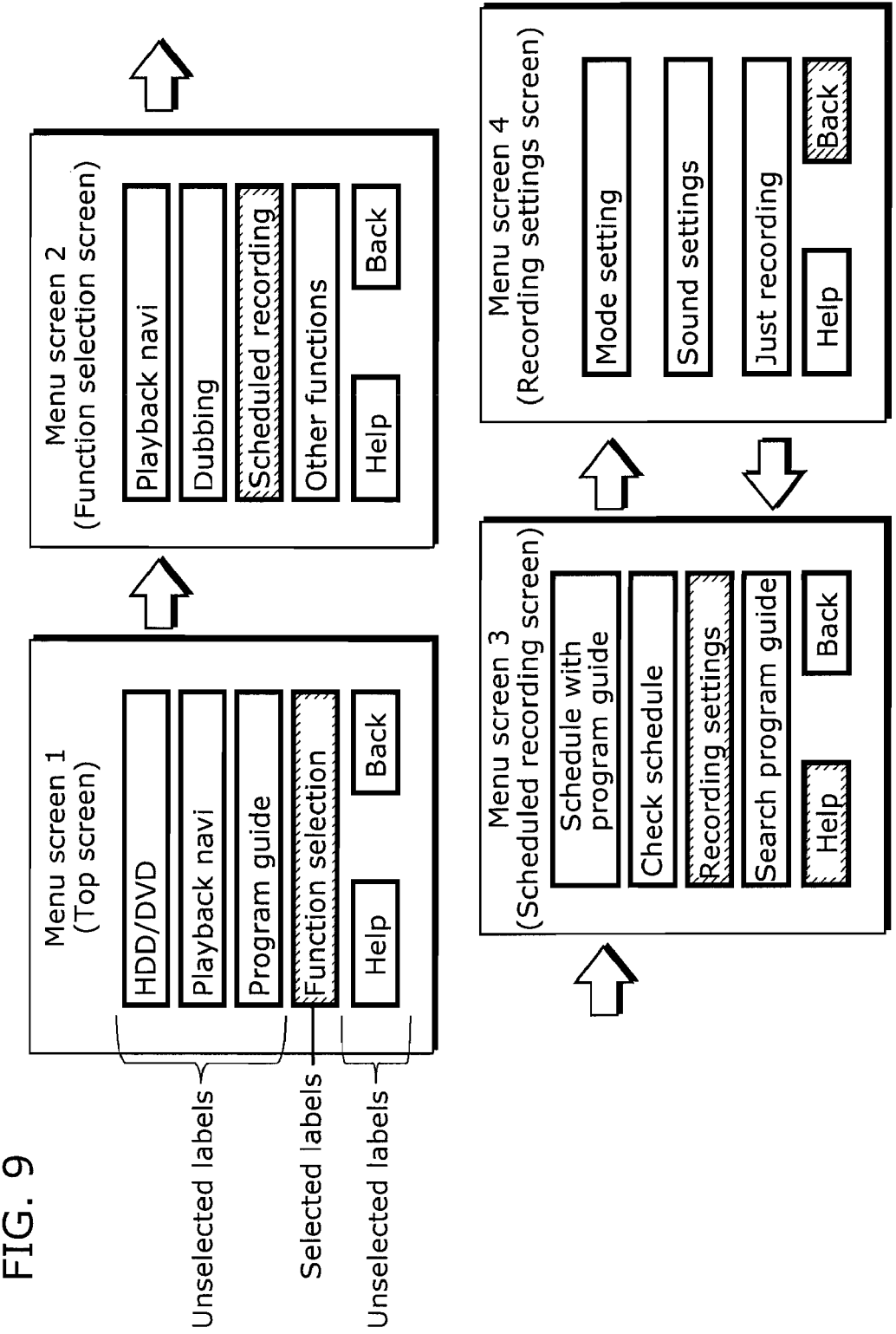

FIG. 11

| | Selected options in history | | | |
|---|---|---|---|---|
| Option-function distance | Function selection | Scheduled recording | Recording settings | Score of function |
| Function 1 | 0.6 | 0.7 | 0.6 | 1.9 |
| Function 2 | ... | ... | ... | ... |
| Function 3 | ... | ... | ... | ... |
| Function 4 | ... | ... | ... | ... |
| .... | | | | |

Functions subjected to estimation

FIG. 15

| Estimated function rank | Estimated function number | Estimated function name |
|---|---|---|
| 1 | G3 | Schedule recording by specifying date/time and channel |
| 2 | G2 | Schedule recording of program selected in program guide |
| 3 | G1 | Record program being currently broadcast |

| Estimated function rank | Estimated function number | Estimated function name |
|---|---|---|
| 1 | G8 | Set image quality of recording-scheduled program |
| 2 | G9 | Set sound of recording-scheduled program |
| 3 | G10 | Configure for scheduling with just recording |

OPERATION ASSISTING APPARATUS AND OPERATION ASSISTING METHOD

TECHNICAL FIELD

The present invention relates to an apparatus, used in a computer application, an electrical appliance, or the like having a selecting-type interface, that assists a user in performing an operation, and in particular to an operation assisting apparatus that estimates a function or content desired by the user, using an operation history concerning selecting-actions by the user.

BACKGROUND ART

In operating recent computer applications, electrical appliances, or the like, which have a great variety of functions, an enormous number of functions can be performed. As interfaces for allowing the enormous number of functions to be performed more easily, selecting-type interfaces having a hierarchical structure are adopted in many applications or pieces of equipment.

In these selecting-type interfaces, the user sequentially selects, from among a plurality of selectable options as designed by a system designer, options which the user considers to be closest to his or her aim, thereby finally accomplishing a desired function. Thus, even a beginner who does not know an exact procedure to be followed in order to perform the desired function can cause the device to perform that function easily.

However, in the case where a system developer's design concept does not agree with aims which the user conceives from the selectable options, the desired function might not be reached, even if the user sequentially selects options that are close to his or her aim. Thus, an assistance is needed that, when the user cannot reach the aim, properly grasps the function demanded by the user based on user input information (the options that have actually been selected so far) and informs the user of an operational procedure to cause the device to perform the corresponding function and a description of that function.

In order to overcome such a problem, a help display device (see Patent Reference 1) has been disclosed that, with each key and each function that can be performed in a system being defined by a system developer beforehand using feature vectors, searches for a function desired by a user by calculating a distance between a feature vector calculated based on a collection of key inputs selected by the user and a feature vector of each function, and presents a result of the search. More specifically, vectors that characterize descriptions of the functions and the keys, such as a "cursor key", "Space", and "Delete", are generated based on characteristic words (e.g., move, up, down, right, delete, insert, etc.) previously defined by a system designer. If the user presses a Help button while editing text, for example, the vectors generated in such a manner are used to generate, based on a history of a key input operation performed before the pressing of the Help button, a key input operation vector representing a characteristic of the key input operation, and calculate a distance between that vector and a vector representing a characteristic of each function, whereby an editing operation desired by the user is estimated.

Patent Reference 1: Japanese Unexamined Patent Application Publication No. 11-231998

DISCLOSURE OF INVENTION

Problems that Invention is to Solve

In the conventional technique, however, the function desired by the user is estimated by searching the functions that can be performed in the system using only a collection of options selected by the user. Therefore, when the selection options selected by the user relate to many functions, an output will include a large number of functions all having high scores, resulting in a problem that the function which the user desires to accomplish is very late in being displayed.

FIG. 1 is a diagram illustrating an exemplary transition of menu screens in a conventional DVD recorder. It is supposed, for example, that the transition of the screens as illustrated in FIG. 1 is made when the user desires to accomplish a certain function in the DVD recorder. Specifically, the user, starting with a top screen, selects selection options "Function selection", "Schedule with program guide", "Back", "Other functions", and "Just recording" in that order, and, judging that he or she is unable to reach the desired function, presses the Help button to ask for a function search result. In such a case, if the conventional technique is used to search for functions related to the selected options, functions related to "program guide", "Schedule", and "recording" will be outputted as high-ranking candidates as the search result. In the DVD recorder, however, the functions related to "program guide", "Schedule", and "recording" are basic functions, and there are very many functions that are related to those keywords, and therefore a probability that the function desired by the user will not be ranked high in the search result becomes high, which is a problem.

The present invention has been conceived to solve such conventional problems, and an object thereof is to provide an operation assisting apparatus and operation assisting method that make it possible to narrow down candidates for the function desired by the user more quickly and accurately.

Means to Solve the Problems

In order to solve the above described conventional problems, an operation assisting apparatus according to the present invention that estimates a function desired by a user based on a history of user operations for selecting an option displayed on a menu screen having a hierarchical structure, and provides an operational assistance based on a result of the estimation includes: an option-function distance storage unit in which a semantic distance between each of the options displayed on the menu screen and each of functions positioned at an end in the hierarchical structure is stored; an estimation unit that estimates a degree of probability that the function is the function desired by the user based on: a semantic distance between a selection option selected by the user and each of the functions; and a semantic distance between an unselected selection option that has been selectable but not selected and each of the functions; and an operational assistance determination unit that determines, based on the result of the estimation, a detail of an output for the operational assistance such that functions with higher probability are presented with higher precedence in selectability. According to this structure, an aim of the user is estimated using information concerning the option that has been selectable but not selected in addition to information concerning the option selected by the user, and therefore, aim estimation is achieved so as to sufficiently reflect an intention of the user in selecting, and more appropriate assistance for the user is made possible in connection with functions for which operational assistance should be provided with high probability.

The operation assisting apparatus according to the present invention further includes an operation history storage unit in which information is stored, the information concerning the history of the user operations for sequentially selecting the options. In the operation assisting apparatus, the semantic distance is defined to have a greater value as the option is semantically closer to the function, and when a "Back" process is performed on the menu screen for returning to a menu screen on a level immediately above in the hierarchical structure, the estimation unit calculates a first selected option distance and a first unselected option distance and decreases, in the estimation, the probability that a corresponding function is the function desired by the user in accordance with a difference between the first selected option distance and the first unselected option distance in the case where the difference is negative, the first selected option distance being a semantic distance between a selected option on the menu screen that is at least immediately previous to the performance of the "Back" process and a function positioned at an end of the selected option, the first unselected option distance being a semantic distance between an unselected option on a menu screen on which the "Back" process has been performed and a function positioned at the end. According to this structure, when the "Back" process has been performed, an aim probability score of a function that is unlikely to be the function desired by the user is recalculated based on the first unselected option distance. As a result, more information than information concerning the selected selection option is obtained regarding selecting-actions by the user, so that assistance toward functions that are not desired by the user can be suppressed. Therefore, the aim estimation can be achieved so as to reflect the intention of the user to a greater extent, and efficient and appropriate assistance can be provided.

The operation assisting apparatus according to the present invention further includes an operation history storage unit in which information is stored, the information concerning the history of the user operations for sequentially selecting the options. In the operation assisting apparatus, when one of the options is selected on the menu screens, the estimation unit calculates a second selected option distance and a second unselected option distance; and decreases, in the estimation, the probability that a corresponding function is the function desired by the user in accordance with a difference between the second selected option distance and the second unselected option distance in the case where the difference is negative, the second selected option distance being a semantic distance between the selected option and each of the functions positioned at an end of an unselected option that has been displayed on the same menu screen as the selected option but not selected, the second unselected option distance being a semantic distance between the unselected option that has been displayed on the same menu screen as the selected option but not selected and each of the functions positioned at the end. Thus, the operation assisting apparatus recalculates the aim probability score based on the second unselected option distance each time the user selects an option, and therefore, operational assistance toward functions that are unlikely to be the function desired by the user can be suppressed, and efficient and appropriate operational assistance can be provided.

It is to be noted that the present invention can be implemented not only as the apparatus but also as: a method that has steps corresponding to the processing units included in the apparatus; a program that causes a computer to perform those steps; a computer-readable storage medium, such as a CD-ROM, that has the program stored therein; or information, data, or a signal that represents the program. The program, the information, the data, and the signal may be delivered via a communication network, such as the Internet.

Effects of the Invention

In the operation assisting apparatus according to the present invention, an aim of the user is estimated using information concerning unselected options that have been selectable but not selected, in addition to information concerning the option selected by the user. Additional use of the information concerning the unselected options enables narrowing down and discrimination of functions with increased accuracy. This enables highly accurate aim estimation that sufficiently reflects the intention of the user in selection, and it is made possible to provide to the user an assistance for functions which are more likely to be a function for which an operational assistance should be provided.

BRIEF DESCRIPTION OF DRAWINGS

FIG. 5 is a table showing results of calculating semantic closeness between word 1 "program" and word 2 "dubbing", "recording", "change", "settings", and "stop", using word semantic vectors generated based on a certain text corpus.

FIG. 6 is a table showing functions and written texts describing contents of the functions such that they are associated with each other.

FIG. 7 is a table illustrating an example of data stored in an option-function distance storage unit.

FIG. 8 is a diagram showing a specific example of an operation history stored in an operation history storage unit.

FIG. 9 is a diagram illustrating an exemplary transition of displayed screens in accordance with selection by a user of selection options.

FIG. 11 is a diagram illustrating a specific example of a method of performing scoring with respect to each function based on the selected options.

FIG. 15 is a diagram showing an example of an estimation result to be outputted from an estimation unit as shown in FIG. 2 to an operational assistance determination unit.

FIG. 16 is a diagram showing an exemplary estimation result obtained in the case where an unselected information-using estimation unit does not recalculate estimation scores.

NUMERICAL REFERENCES

Figure 1:
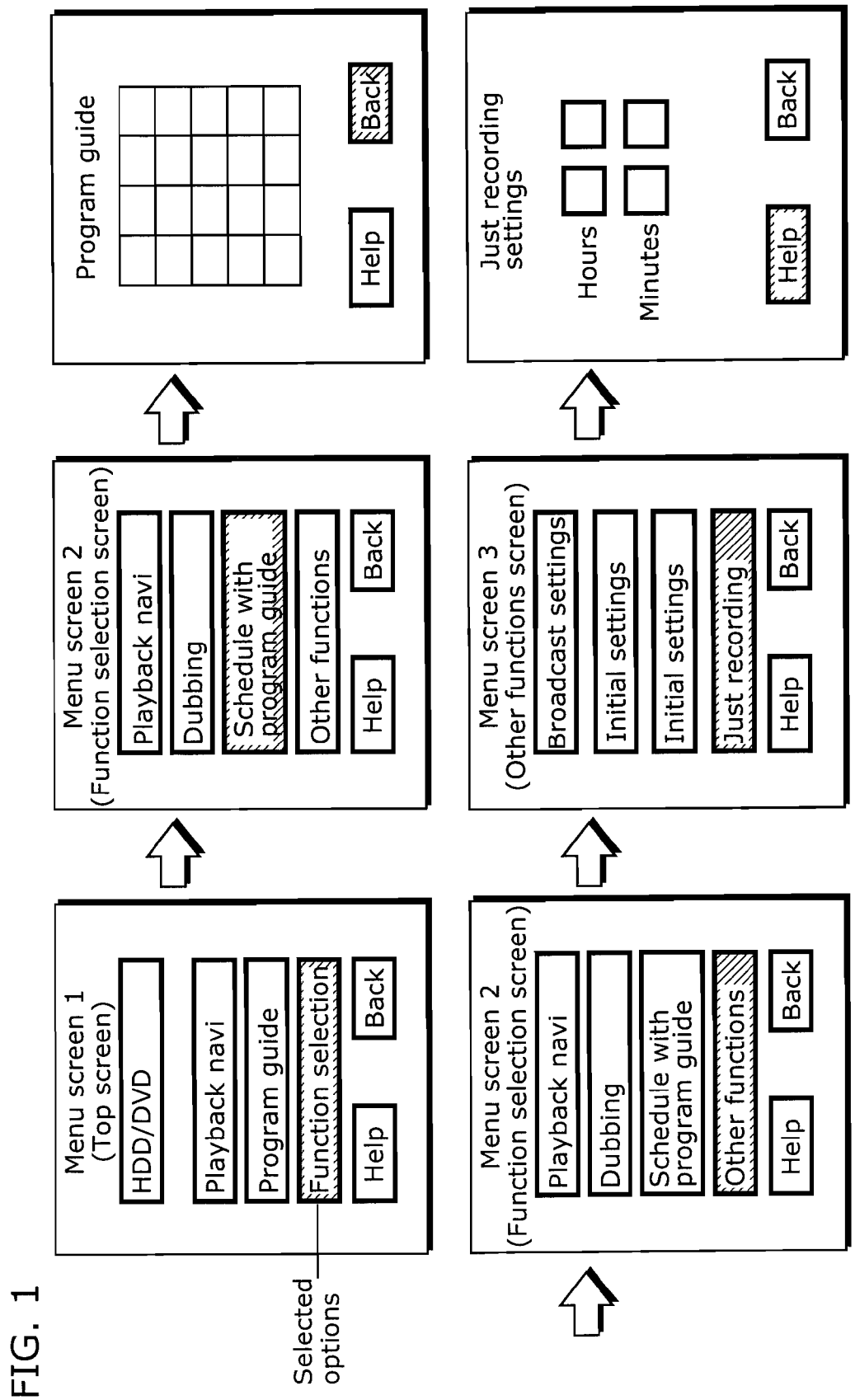
FIG. 1 is a diagram illustrating an exemplary transition of menu screens in a conventional DVD recorder.

101 Input unit
102 Text corpus storage unit
103 Word concept storage unit
104 System information storage unit
105 Option-function distance calculation unit
106 Option-function distance storage unit
107 Operation history storage unit
108 Selected information-using estimation unit
109 Unselected information-using estimation unit
110 Operational assistance determination unit
111 Output unit
112 Timer
113 Control unit
114 Estimation unit

BEST MODE FOR CARRYING OUT THE INVENTION

Study of the above-described conventional technique reveals that, when providing an assistance for an operation by estimating an aim that agrees more with an intention of a user's operation based on a selecting history of selection options, it is difficult to estimate a function by using only the selected options as in the conventional technique, and that it is necessary to gain more information from a selecting-action of the user to determine whether or not each function is the aim of the user.

As described above, in the case of a selecting-type interface, without grasping an overall structure of the selection options having a hierarchical structure, the user is able to reach a desired function by selecting, from among presented selection options, an option which the user considers to be closest to the aim, and repeating such a selection. A detailed analysis of this selecting-action reveals two characteristics below.

1. The user determines a closeness in content between a function represented by a description displayed on each of the presented selection options and the desired function, and compares the closenesses of the selection options thereto with one another to select the closest selection option. Therefore, the selected selection option is closer to the desired function than are the options that have not been selected, i.e., unselected options, whereas the unselected options are distant from the desired function.

2. Similarly, functions that are close to the unselected options are less likely to be the desired function than the selected option.

As shown above, in order to estimate the intention of the user more accurately, it is necessary to estimate the aim using not only information concerning the selected option but also information concerning the unselected options, which have been compared against the selected option at the time of selection, more specifically information concerning a distance between each of the selected option and the unselected options and each function.

As an embodiment of the present invention based on the above-described concepts, a method will now be described below, with reference to the accompanying drawings, in which the distance, i.e., a distance representing semantic closeness as perceived by the user, between each of the selected option and the unselected option and each function is approximated based on distances between different words as calculated using a text corpus, and a difference between the two distances is used to recalculate a score for aim estimation.

First Embodiment

Figure 2:
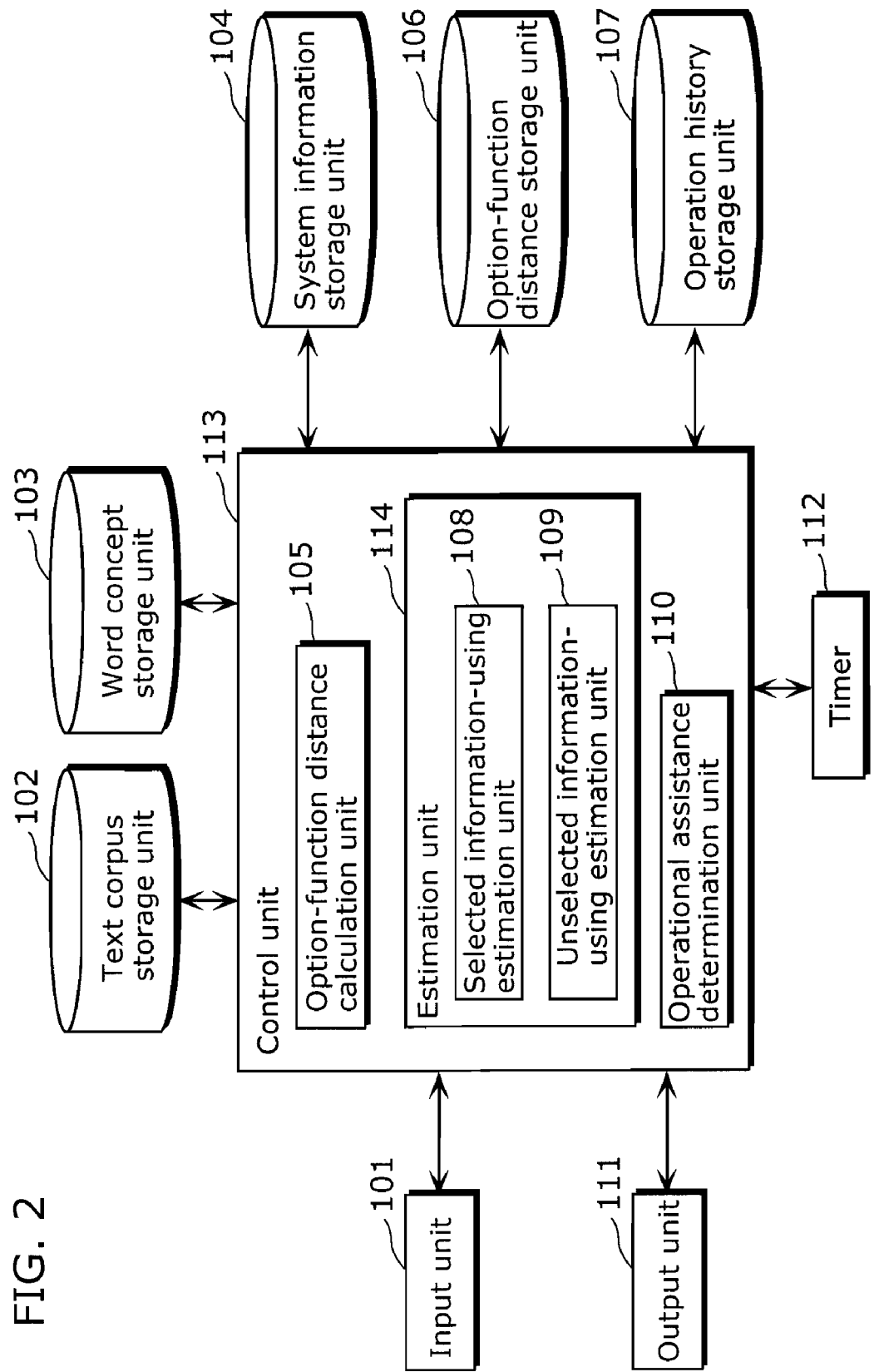
FIG. 2 is a block diagram illustrating the structure of an operation assisting apparatus according to a first embodiment of the present invention.

FIG. 2 is a block diagram illustrating the structure of an operation assisting apparatus according to a first embodiment of the present invention. The operation assisting apparatus as shown in FIG. 2 is an operation assisting apparatus that estimates a probability of each function being the function desired by the user, based on a semantic distance between a selection option that has been selected on a menu screen that is immediately previous to performance of a "Back" process and each function, and a semantic distance between an unselected option that has not been selected on a menu screen on which the "Back" process has been performed and each function, and provides an operational assistance based on results of the estimation. The operation assisting apparatus includes an input unit 101, a text corpus storage unit 102, a word concept storage unit 103, a system information storage unit 104, an option-function distance calculation unit 105, an option-function distance storage unit 106, an operation history storage unit 107, a selected information-using estimation unit 108, an unselected information-using estimation unit 109, an operational assistance determination unit 110, an output unit 111, a timer 112, a control unit 113, and an estimation unit 114.

The input unit 101 accepts an input operation by the user. The text corpus storage unit 102 stores the text corpus, which is used to generate a word concept. The word concept storage unit 103 stores a word concept of functions that are displayed on the selection options. The system information storage unit 104 stores: information concerning functions provided in a system; structure information including a hierarchical structure of the selection options in an interface of the system and so on; selection option information, which is information concerning each of the selection options; and so on. The option-function distance calculation unit 105 generates the word concept based on the text corpus stored in the text corpus storage unit 102 and stores a result on the word concept storage unit 103, and calculates the distance between each selection option and each function using the information stored in the system information storage unit 104. The option-function distance storage unit 106, which is an example of an option-function distance storage unit that stores a semantic distance between each of the options displayed on the menu screens and each of functions positioned at an end in the hierarchical structure, stores the distance between each option and each function as calculated by the option-function distance calculation unit 105. The operation history storage unit 107, which is an example of an operation history storage unit that stores information concerning the history of the user operations for sequentially selecting the options, stores information concerning the operations inputted via the input unit 101 together with a system state at the time. The selected information-using estimation unit 108 estimates the function desired by the user based on the selected option and the distance between each option and each function as stored in the option-function distance storage unit 106. The unselected information-using estimation unit 109 recalculates a probability of each function being the aim, based on information concerning the selected option, information concerning the unselected option, and the distance between each option and each function stored in the option-function distance storage unit 106. The operational assistance determination unit 110, which is an example of an operational assistance determination unit that determines, based on the result of the estimation, a detail of an output for the operational assistance such that functions with higher probability are presented with higher precedence in selectability, determines that a function with high estimation score recalculated by the unselected information-using estimation unit 109 is the function desired by the user, and determines a method of assisting the user in operation in accordance with that function. The output unit 111 performs display output via a display or the like, and sound output via a loudspeaker or the like. The timer 112 calculates a time it takes for the user to perform an operation of selecting the selection option, or the like. The control unit 113, which is an example of a control unit that outputs the detail for the operational assistance determined by the operational assistance determination unit when detecting: that a Help button is pressed, that a predetermined time has passed without any operation being performed since an option previous to any of the functions at the ends in the hierarchical structure has been selected, or a specific pattern of user operations, performs an overall control process for the operation assisting apparatus, including the above processes. The estimation unit 114, which is an example of an estimation unit that estimates, based on a semantic distance between a selection option selected by the user and each of the functions, and a semantic distance between an unselected option that has been selectable but not selected and each of the functions, a degree of probability that the function is the function desired by the user, performs overall control related to the estimation. It is defined that the semantic distance has greater values as the option and the function are semantically closer to each other, for example. Also, the estimation unit 114 is an example of an estimation unit that, when a "Back" process is performed in the menu screens for returning to a menu screen on a level immediately above in the hierarchical structure, calculates a first selected option distance and a first unselected option distance, and, when a difference between the first selected option distance and the first unselected option distance is negative, decreases, in the estimation, the probability that a corresponding function is the function desired by the user in accordance with the difference, the first selected option distance being a semantic distance between a selected option on the menu screen that is immediately previous to performance of the "Back" process and a function positioned at an end of the selected option, the first unselected option distance being a semantic distance between an unselected option on a menu screen on which the "Back" process has been performed and the function positioned at the end. Further, the estimation unit 114 is an example of an estimation unit that further increases, in the estimation, the probability that the corresponding function is the function desired by the user in accordance with a difference between the first selected option distance and the first unselected option distance in the case where the difference is positive.

Figure 3:
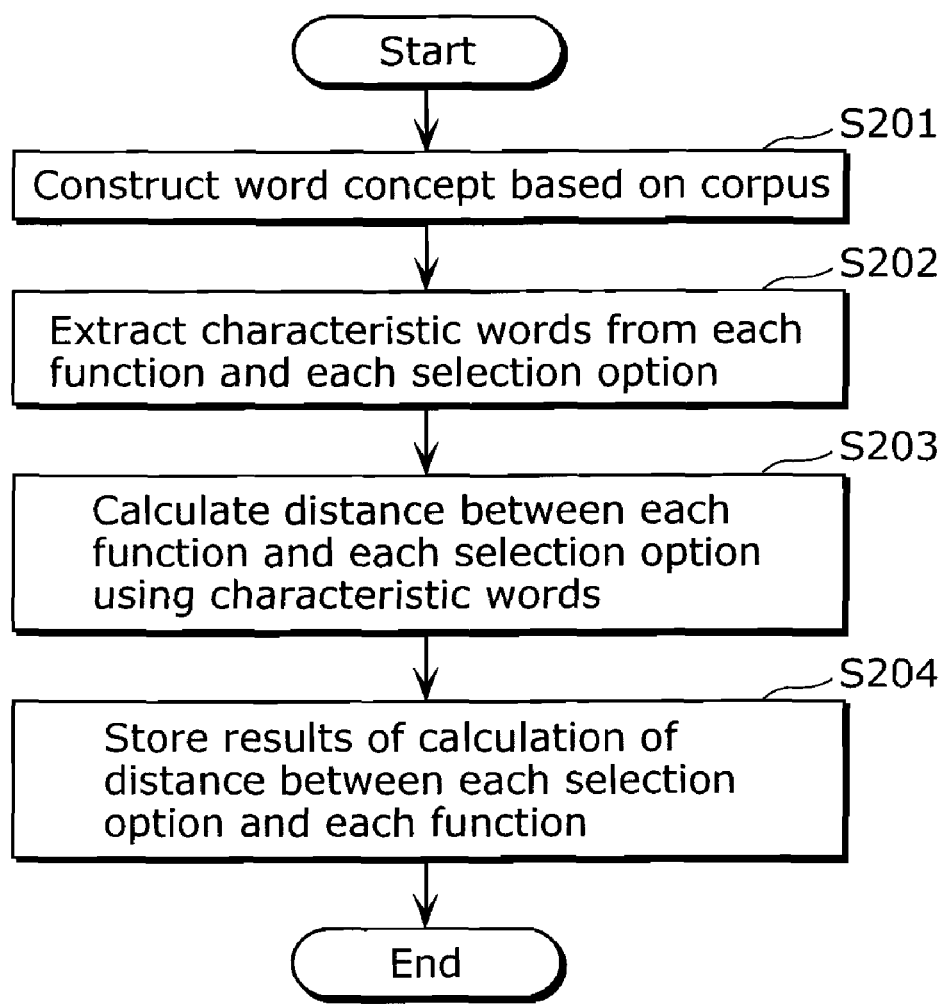
FIG. 3 is a flowchart illustrating a procedure of off-line processing for constructing a word concept.
Figure 4:
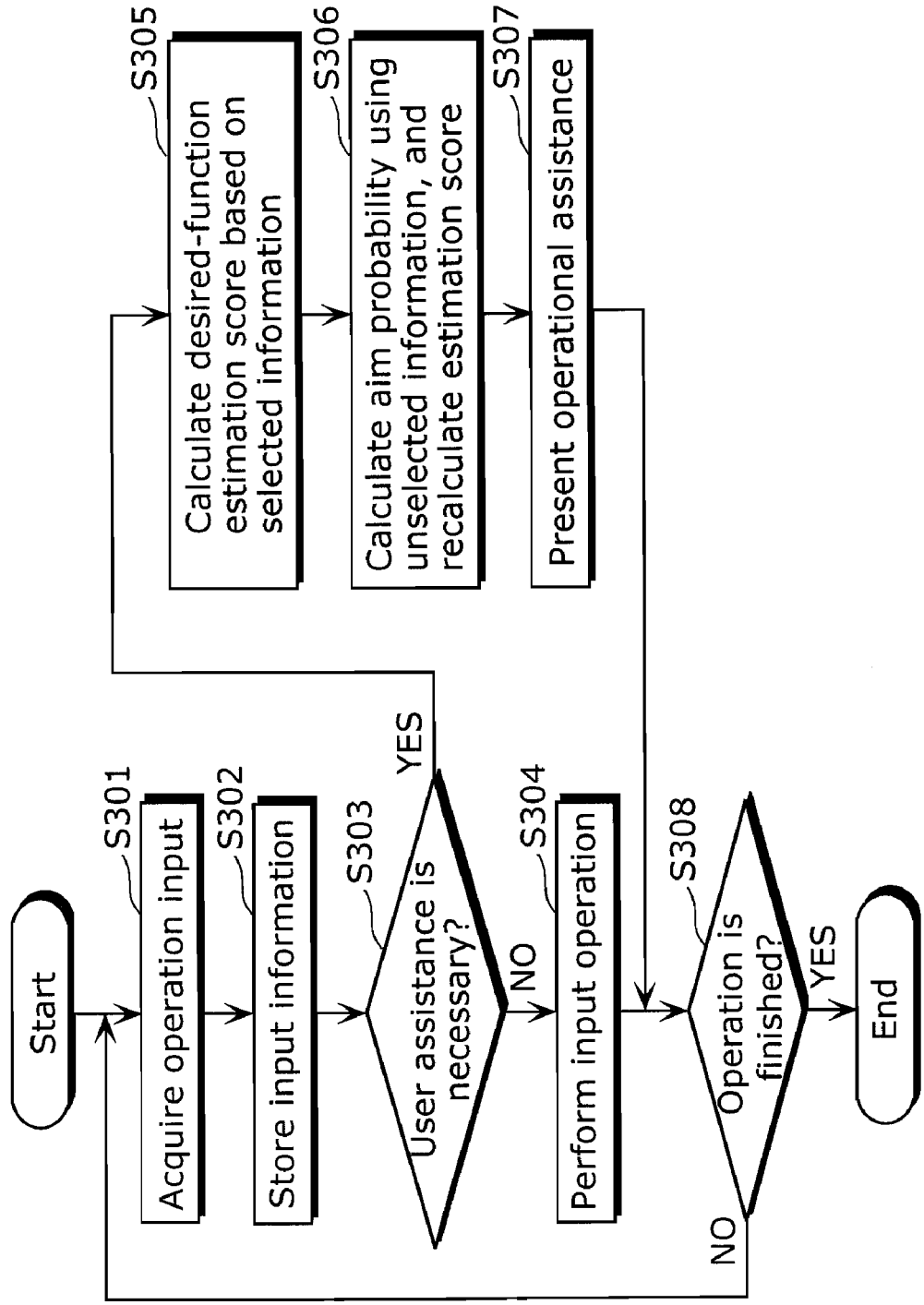
FIG. 4 is a flowchart illustrating a procedure of on-line processing for estimating an aim probability score of each function using the constructed word concept.

A specific operation using an operation assisting apparatus in a DVD recorder, which is an example of the operation assisting apparatus having the above structure, will now be described below, primarily with reference to flowcharts as shown in FIG. 3 and FIG. 4.

FIG. 3 is a flowchart illustrating a procedure of off-line processing for constructing the word concept. First, the off-line processing will now be described below with reference to the flowchart of FIG. 3.

It is to be noted that the off-line processing as described below is a process for constructing the word concept used for calculating a distance between words using the text corpus, and needs to be performed only once unless the text corpus used when constructing the word concept is changed. Therefore, the off-line processing may be performed at any time as long as it is before performance of on-line processing, and alternatively, the word concept may be constructed in another off-line system and that word concept may be used.

In Step 201, the option-function distance calculation unit 105 first constructs the word concept for representing the distance between words, using the text corpus stored in the text corpus storage unit 102. It is to be noted that, as the text corpus used for generating the word concept in the present embodiment, a collection of general written texts, such as newspaper articles, manuals, and websites on the Internet, is used in order to construct a word concept of general users.

In the present embodiment, latent semantic analysis (LSA) is used as a technique for generating a word semantic concept from the text corpus.

The latent semantic analysis is a theory of subjecting all words or collections of words that appear in a large-scale text corpus to statistical calculation (singular value decomposition) and dimension reduction to derive usages of meanings of words in various contexts and express them as a semantic space, whereby each word or context can be represented by a vector of a certain dimension. The fact that the semantic space generated in the above-described manner reflects human knowledge is verified in various fields (Nihon Chino Joho Faji Gakkaishi [Journal of Japan Society for Fuzzy Theory and Intelligent Informatics] "Yogo Kaisetsu", February 2005 (Non-patent Reference 1)).

As a result of generating the above semantic space, each word or context is represented by a vector, and therefore a similarity between different words or contexts can be obtained by an inner product of the vectors. Hereinafter, a word vector on the semantic space generated in the above-described manner will be referred to as a word semantic vector, and a distance obtained by an inner product between words will be referred to as a semantic closeness between the words or a semantic distance between the words. In addition, the generated semantic space will be referred to as the word concept.

Specifically, FIG. 5 is a table showing results of calculating the semantic closeness between word 1 "program" and word 2 "dubbing", "recording", "change", "settings", and "stop", using word semantic vectors generated based on a certain text corpus. It is to be noted that, in the semantic distances as shown in FIG. 5, greater values indicate shorter semantic distances between word 1 and word 2. The semantic closeness between the words as generated by this corpus shows that "dubbing" (semantic distance=0.143) and "recording" (semantic distance=0.123) are semantically close to the word "program", while "stop" (semantic distance=0.044) is semantically distant from the word "program".

The word concept generated in the above-described manner, more specifically the word semantic vectors of the words, is stored in the word concept storage unit 103.

In Step 202 in FIG. 3, the option-function distance calculation unit 105 extracts words that describe characteristics of each of the functions that can be performed by the system (hereinafter designated simply as "each function") and each of the options that are selectable on input screens of the system (hereinafter designated simply as "each selection option"). FIG. 6 is a table showing the functions and written texts describing contents of the functions in association with each other. More specifically, a word that characterizes each of the functions is extracted from a written text that describes the function as shown in FIG. 6 as stored in the system information storage unit 104. It is to be noted that, in FIG. 6, an item 501 is a function No. used to manage the functions, an item 502 is a function name, an item 503 is a function description in which the description of the function, an operation method, a comment, and so on are written, and an item 504 is an operational procedure that lists options to be selected in order to accomplish the function, in an order in which they should be selected. Contents of the information describing each of the functions may either be those contained in a manual, or may be generated independently.

As for a specific method of extracting the word that characterizes each of the functions, a document containing the function name or the function description may be subjected to morphological analysis to be divided into morphemes. From the resulting morphemes, a specific one of the morphemes, or two or more of the morphemes combined together, is extracted as the word that characterizes the function. More specifically, this extraction may be based on parts of speech (for example, a noun, a verb, etc.) of morphemes that appear in the function name or function description as the word that characterizes the function, or based on the use of information concerning the frequency of appearance of the morphemes. One exemplary method of using the frequency of appearance is a method of choosing a morpheme that appears with high frequency in the function name or description of a certain function but appears with low frequency in the function names or descriptions of other functions, as the word that characterizes that certain function. A characteristic word is also extracted from each of the selection options in a similar manner.

In Step 203 as shown in FIG. 3, the option-function distance calculation unit 105 retrieves, from the word concept storage unit 103, the words that characterize the respective functions and the respective selection options as extracted in Step 202, and calculates the distance between each function and each selection option.

For example, it is assumed that in Step 202, characteristic words, "recording", "schedule", "date/time", "channel", "specifying", "scheduling", and "timer", have been extracted with respect to a function of function No. 1 (hereinafter designated simply as "function 1") as shown in FIG. 6, whereas characteristic words, "function" and "selection", have been extracted with respect to a selection option "Function selection". In this case, in Step 203, the word semantic vectors corresponding to these words are retrieved from the word concept storage unit 103, and the word vectors are added to generate a vector that represents function 1 and a vector that represents the selection option "Function selection". Then, the inner product between the generated vectors that represent the function and the selection option is calculated to obtain the distance between the function and the selection option.

It is to be noted that, before the word semantic vectors are added, they may be weighted based on the method of extracting the words that characterize the functions. Specifically, in the case where the words that characterize the functions have been extracted based on the parts of speech, a higher weight may be assigned to the verb than the noun when adding them, for example. In the case where the words that characterize the functions are extracted based on the frequency of appearance of the words, a method is conceivable of assigning higher weights to words that appear with high frequency in the function name or the description of the function, and words that appear with low frequency in the function names or descriptions of the other functions, for example. In the above-described example, the vectors that represent the function and the selection option are first generated based on the characteristic words, and the distance between the function and the selection option is defined as the distance between the generated vectors. It is to be noted, however, that it may be so arranged that distances between the characteristic words contained in the function and the selection option are calculated first, and thereafter the distance between the function and the selection option is calculated as the sum thereof.

In Step 204, the option-function distance calculation unit 105 stores the distance between each function and each selection option as calculated in Step 203 in the option-function distance storage unit 106.

FIG. 7 is a table illustrating an example of data stored in the option-function distance storage unit 106. An item 601 is a management number, an item 602 is a selection option name, an item 603 is a function name, and an item 604 is an option-function distance that represents the semantic distance between the option name and the function name as calculated by the above-described method.

It is assumed here that the option-function distance is normalized, and examples that follow are assumed that the maximum value thereof is 1.

FIG. 4 is a flowchart illustrating a procedure of estimating an aim probability score of each function using the constructed word concept. Next, the on-line processing will now be described below with reference to the flowchart of FIG. 4.

In Step 301, a user selection result, which the user inputs via the input unit 101, is passed to the control unit 113.

In Step 302, the control unit 113 stores the result inputted via the input unit 101 and information concerning the system state at the time in the operation history storage unit 107, and uses them for control of an operation of the system. FIG. 8 is a diagram showing a specific example of an operation history stored in the operation history storage unit 107. The operation history as shown in FIG. 8 is an example of the operation history of the user, who aims at function 1 "Schedule recording by specifying date/time and channel" as shown in FIG. 6. In FIG. 8, an item 701 is a history No., an item 702 is a date/time at the time of selection, and an item 703 is a pending time at the time of selection, meaning the length of time between placement of a cursor upon the selection option and pressing of the selection option. An item 704 is a name of a displayed screen (a name of a menu screen), an item 705 is a name of a selection option selected by the user from within the displayed screen indicated at the item 704, and an item 706 is all selection options (i.e., unselected options), except for the selection option selected by the user as indicated at the item 705, that are on the displayed screen indicated at the item 704.

FIG. 9 is a diagram illustrating an exemplary transition of displayed screens in accordance with the selection by the user of the selection options. A specific operation sequence of the operation history as shown in FIG. 8 will now be described below with reference to the diagram of the transition of the displayed screens as shown in FIG. 9. First, the user selects the selection option "Function selection" on menu screen 1 (a top menu) as shown in FIG. 9, which is a screen of a top menu (history No. 1). As a result of "Function selection" being selected, menu screen 2 (a function selection screen) as shown in FIG. 9 is displayed, and the user selects "Scheduled recording" from among alternatives thereon (history No. 2). As a result of "Scheduled recording" being selected, menu screen 3 (a scheduled recording screen) as shown in FIG. 9 is displayed, and the user selects "Recording settings" from among alternatives thereon (history No. 3). Here, the user, viewing a screen of "Recording settings", judges that the function desired by the user will not be found ahead, and accordingly selects "Back". As a result of "Back" being selected, the menu screen 3 as shown in FIG. 9 is displayed again (history No. 4). Here, the user, becoming unsure of which selection option to select in order to accomplish his or her aim, selects a Help option on the menu screen 3 as shown in FIG. 9 (history No. 5).

In Step 303, the control unit 113 determines whether or not an operational assistance needs to be provided to the user. This determination may be made based on a request from the input unit, such as the user himself or herself selecting the Help option as in the above specific example, or may be automatically made by detecting the pending time or a specific pattern from the operation history. Specifically, there are a method of determining that the operational assistance is necessary when the pending time exceeds a certain length of time, and a method of detecting a user's action, such as selecting the same selection option several times or selecting a previously defined selecting pattern, to determine that the operational assistance is necessary.

When it is determined in Step 303 that there is no need for the operational assistance, control proceeds to NO in Step 303; that is, to Step 304. In Step 304, the control unit 113 performs control in accordance with the input operation, and control proceeds to Step 308. In Step 308, the control unit 113 determines whether or not the operation is finished. When the operation is not finished and a subsequent input is required, control proceeds to NO in Step 308, i.e., to Step 301, to accept an input operation from the user again. When it is determined that the operation is finished, this procedure is finished.

Meanwhile, when it is determined in Step 303 that the operational assistance is necessary, control proceeds to YES in Step 303, i.e., to Step 305.

Figure 10:
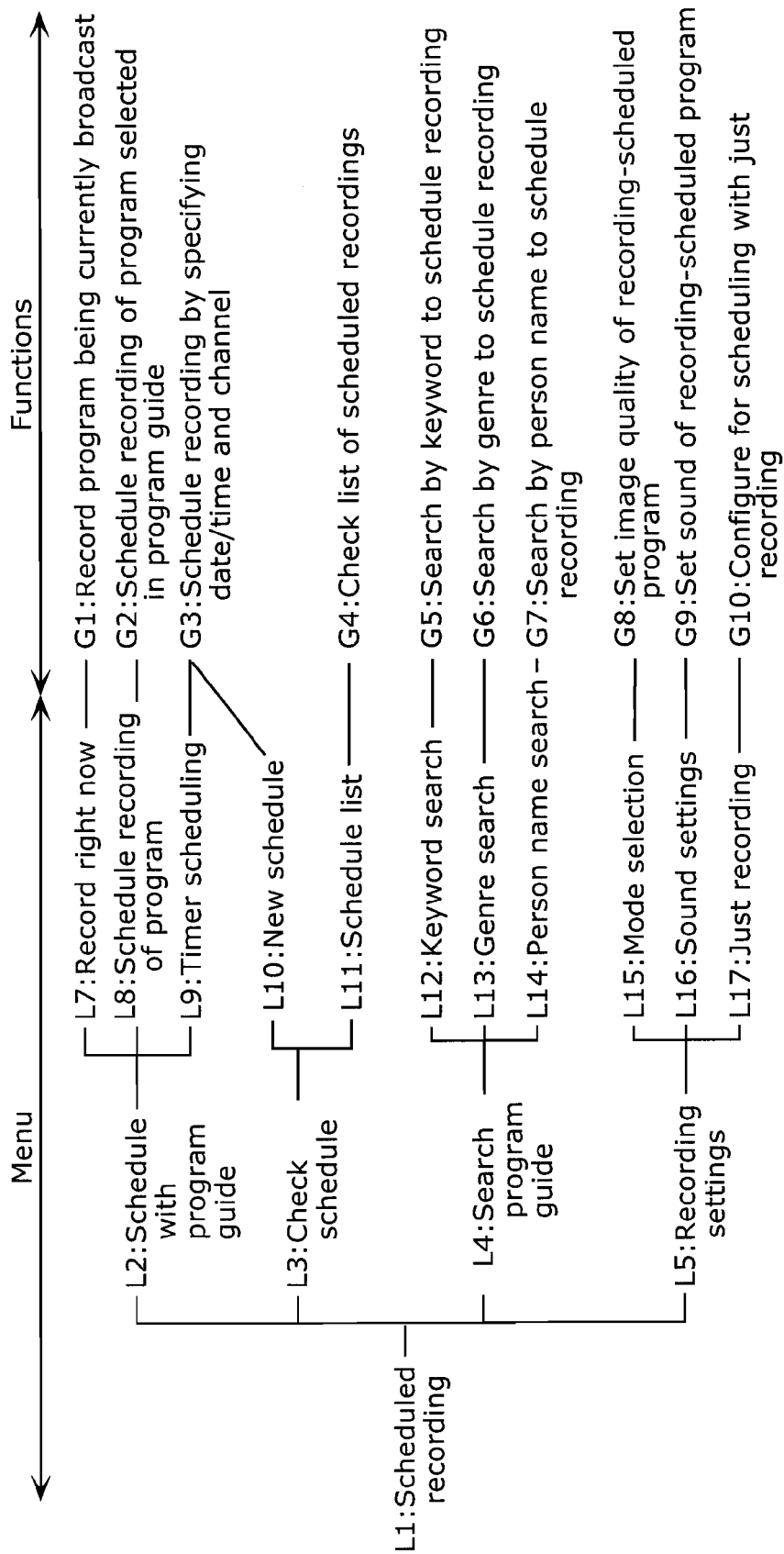
FIG. 10 is a diagram illustrating exemplary menu structure information representing a hierarchical structure of a menu in a system.

FIG. 10 is a diagram illustrating exemplary menu structure information representing a hierarchical structure of a menu in the system. A specific example of a procedure performed between Step 305 and Step 307 in the flowchart of FIG. 4 will now be described below with reference to the exemplary operation history as shown in FIG. 8, the operation sequence as shown in FIG. 9, and a part of the menu structure information of the system as shown in FIG. 10.

First, in Step 305, the selected information-using estimation unit 108 estimates the aim of the user by using information of the history of the options selected by the user. In other words, the selected information-using estimation unit 108 performs scoring with respect to each function, using information concerning the selected options. It is to be noted here that a system developer specifies beforehand which selected options are used for aim estimation. Specifically, it may be so configured that specified options such as "Back" and "Help" are not used for the aim estimation even when they have been selected, and it may also be so arranged that the options are divided into morphemes and information of the parts of speech thereof or the like is used for decision.

FIG. 11 is a diagram illustrating a specific example of a method of performing the scoring with respect to each function based on the selected options. The selected information-using estimation unit 108 holds functions that are objects of estimation as stored in the system information storage unit 104. Next, the selected information-using estimation unit 108 extracts the selected options from the operation history storage unit 107. Specifically, in the case of the operation history as shown in FIG. 8, the selected information-using estimation unit 108 extracts "Function selection", "Scheduled recording", and "Recording settings". Next, the selected information-using estimation unit 108 determines an estimation score of each function by extracting the distance between each function and each selected option from the option-function distance storage unit 106, and, with respect to each function, adding the distances between each selected option and the function. More specifically, in the case where the distances of function 1 (i.e., "Schedule recording by specifying date/time and channel") from the selected options "Function selection", "Scheduled recording", and "Recording settings" are 0.6, 0.7, and 0.6, respectively, as shown in FIG. 11, an estimation score of this function based on the selected labels is 0.6+0.7+0.6=1.9. It is to be noted that although, in FIG. 11, all options are arranged horizontally for easier reference, it is possible that only a single area be provided for storing the score of each function, and that the distances of the selected options therefrom be added one by one.

In Step 306 in FIG. 4, with respect to specific functions, the unselected information-using estimation unit 109 calculates a score (hereinafter designated simply as an "aim probability score") representing a probability that the function is the desired function, using information concerning the unselected options in addition to the information concerning the selection among the information of the operation history of the user. The unselected information-using estimation unit 109 uses a result of this calculation to recalculate the estimation score of each function as calculated in Step 305.

More specifically, a "Back" action of the user is detected, and the aim probability score of each function is calculated using a difference between the distance between the unselected options displayed at the time of "Back" (such as, "Mode setting", "Sound settings", and "Just recording" displayed on menu screen 4 in FIG. 9) and the function and the distance between the options selected so far ("Function selection", "Scheduled recording", and "Recording settings") and the function, and then its value is added to or subtracted from the estimation score calculated in Step 305.

The calculation of the aim probability score according to this technique reflects a characteristic fact that the user's action of selecting "Back" instead of selecting any of the options in the selecting-type interface is an action resulted from the user's judgment that the function that he or she desires to perform will not be found subsequent to any of the unselected options. In other words, this technique reflects a characteristic fact that functions to which the unselected options are closer than are the options that have been selected so far are less likely to be the desired function. Use of this method of calculating the estimation score makes it possible to discriminate more accurately between the function desired by the user and the other functions than when only the selected options are used to calculate the estimation score, thereby allowing a result of the estimation to be outputted to be closer to the aim of the user. More specifically, the difference between the distance between the function and the selected option and the distance between the function and the unselected option is reproduced using the quantified option-function distances based on the corpus as described above, and its value is used to calculate an aim probability of the function in relation to an action that has not been chosen by the user.

Figure 12:
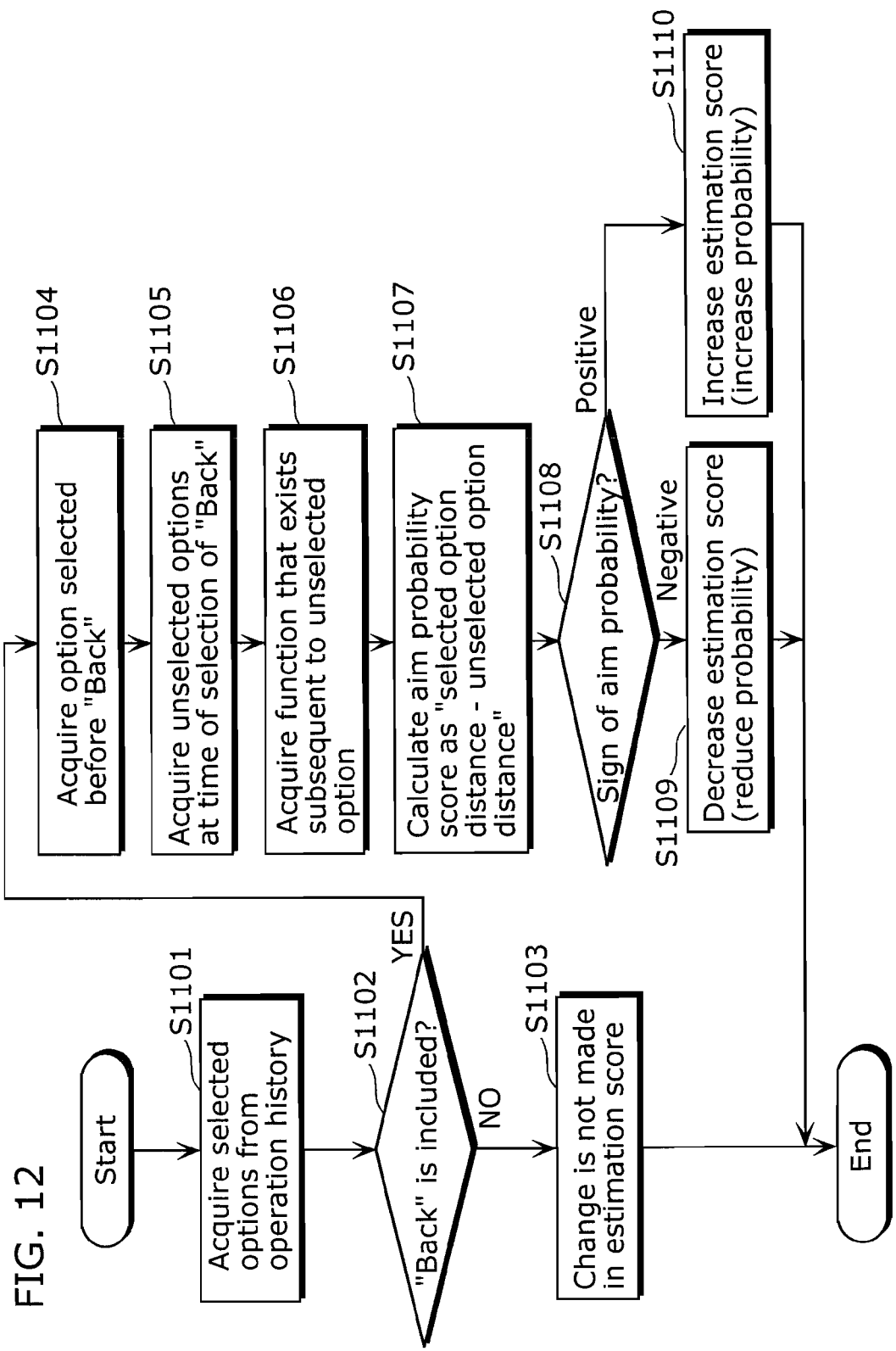
FIG. 12 is a flowchart illustrating a more detailed procedure in Step 306 as shown in FIG. 4.
Figure 13:
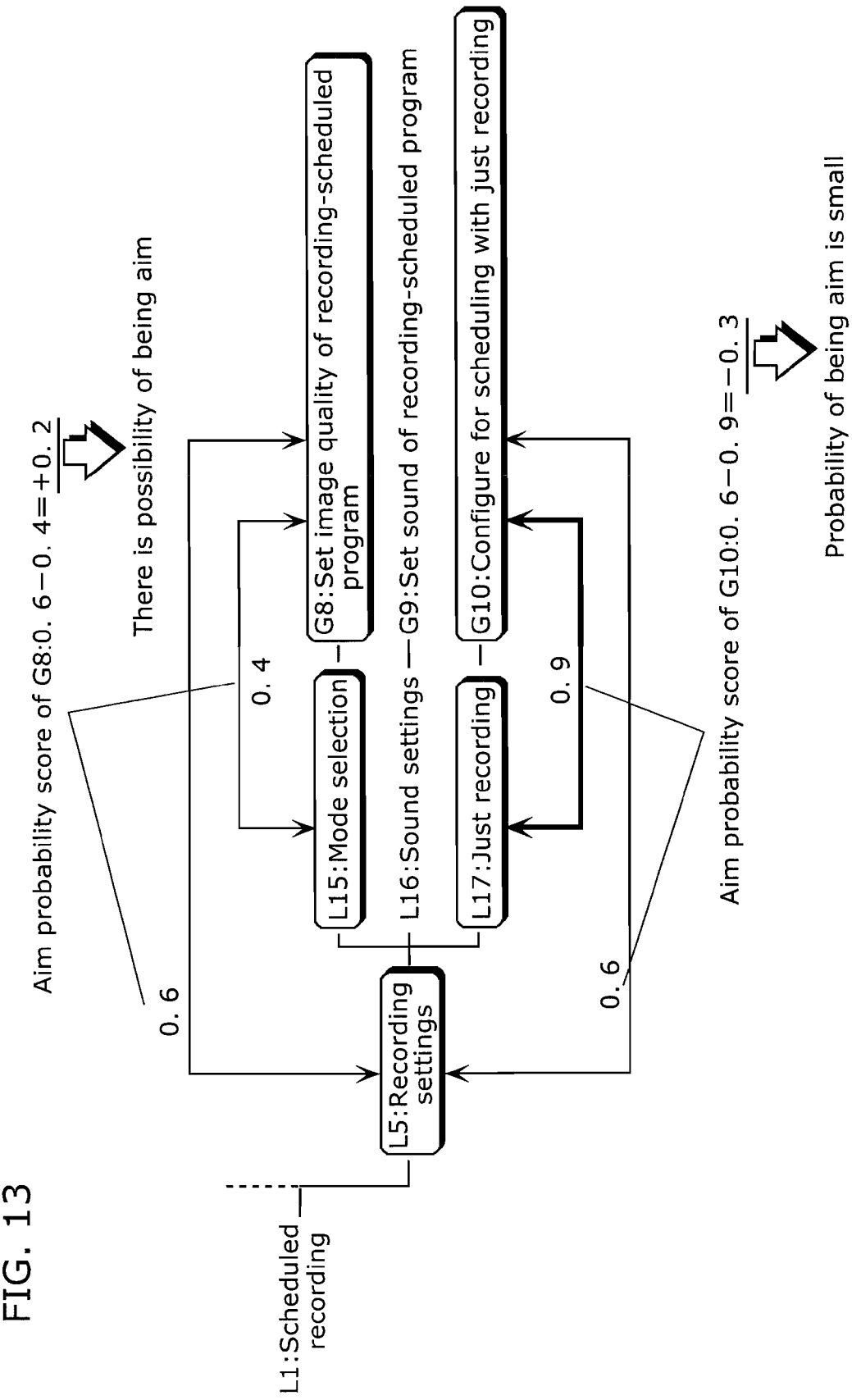
FIG. 13 is a diagram showing a part of the menu structure information as shown in FIG. 10.

FIG. 12 is a flowchart illustrating a more detailed procedure in Step 306 as shown in FIG. 4. FIG. 13 is a diagram showing a part of the menu structure information as shown in FIG. 10. The process (the recalculation of the estimation score using unselected information) performed in Step 306 as shown in FIG. 4 will now be described below specifically with reference to the flowchart of FIG. 12 and the hierarchy diagram as shown in FIG. 13, which is a part of the hierarchy diagram of FIG. 10. It is to be noted that numerical values in FIG. 13 represent distances between options and functions as stored in the option-function distance storage unit 106.

First, the unselected information-using estimation unit 109, in Step 1101, acquires the selected options from the operation history stored in the operation history storage unit 107, and, in Step 1102, determines whether "Back" is included in the acquired selected options. In the case where "Back" has not been selected, control proceeds to Step 1103, and the estimation unit 114 outputs, as the estimation score, the estimation score as calculated by the selected information-using estimation unit 108 to the operational assistance determination unit 110, without making a change therein.

Meanwhile, when it is determined in Step 1102 that "Back" has been selected, control proceeds to YES in Step 1102 i.e., to Step 1104. In Step 1104, an option that has been selected before selection of "Back" is acquired, and then in Step 1105, options that are on the same screen where "Back" has been selected but which have not been selected (hereinafter designated simply as "unselected options") are acquired. Specifically, in the case of the operation history as shown in FIG. 8, "Recording settings" is acquired as the option selected before the selection of "Back", while "Mode setting", "Sound settings", and "Just recording" are acquired as the unselected options at the time of the selection of "Back".

Next, in Step 1107, the unselected information-using estimation unit 109 acquires a distance between the unselected option and each function that exists subsequent to the unselected option (hereinafter designated simply as an "unselected option distance"), and a distance between the selected option and the function that exists subsequent to the unselected option (hereinafter designated simply as a "selected option distance"), and calculates a value obtained by subtracting the unselected option distance from the selected option distance as the aim probability score.

Specifically, the unselected information-using estimation unit 109 first acquires, from the option-function distance storage unit 106, a distance between an option name "Recording settings" (hereinafter designated as "L5"), which is the selected option at the time of the selection of "Back", and a function "Configure for scheduling with just recording" (hereinafter designated as "G10"), which exists subsequent to an unselected option "Just recording" (hereinafter designated as "L17"), and a distance between the unselected option L17 and the function G10, and calculates a difference therebetween as the aim probability score. More specifically, as shown in FIG. 13, the distance between L5 and G10 is 0.6, and the distance between L17 and G10 is 0.9, and therefore the aim probability score of G10 in relation to L5 is 0.6−0.9=−0.3.

Also with respect to other unselected options "Mode selection" and "Sound settings" and functions that exist subsequent to them, the aim probability scores are calculated in a similar manner based on the difference between the distance between the selected option and the function and the distance between the unselected option and the function. For example, a selected option distance between G8 and L5 is 0.6, and an unselected option distance between G8 and L15 is 0.4. Therefore, the aim probability score of G8 in relation to L5 is 0.6−0.4=0.2.

In Step 1108 in FIG. 12, a determination is made as to a change in the estimation score based on the aim probability score calculated in Step 1107. When the aim probability score is negative, i.e., when the unselected option distance is greater than the selected option distance, control proceeds to Step 1109, and the estimation score is decreased by a value that is proportional to an absolute value of the aim probability score (that is, a probability of that function being the desired function is reduced). Meanwhile, when the aim probability score is positive, i.e., when the unselected option distance is less than the selected option distance, control proceeds to Step 1110, and the estimation score is increased by a value that is proportional to the absolute value of the aim probability score (that is, the probability of that function being the aim is increased).

Specifically, the aim probability score of G10 is −0.3 as described above, and similarly the aim probability score of G8 is 0.6−0.4=0.2 as shown in FIG. 13, and therefore, the result of recalculating the estimation score for G10 is a value obtained by adding −0.3α to the estimation score as calculated in Step 305 in FIG. 4, and the result of recalculating the estimation score for G8 is a value obtained by adding +0.2α to the estimation score as calculated in Step 305. It is to be noted that a is a positive weighting constant, and it is determined by a designer.

Figure 14:
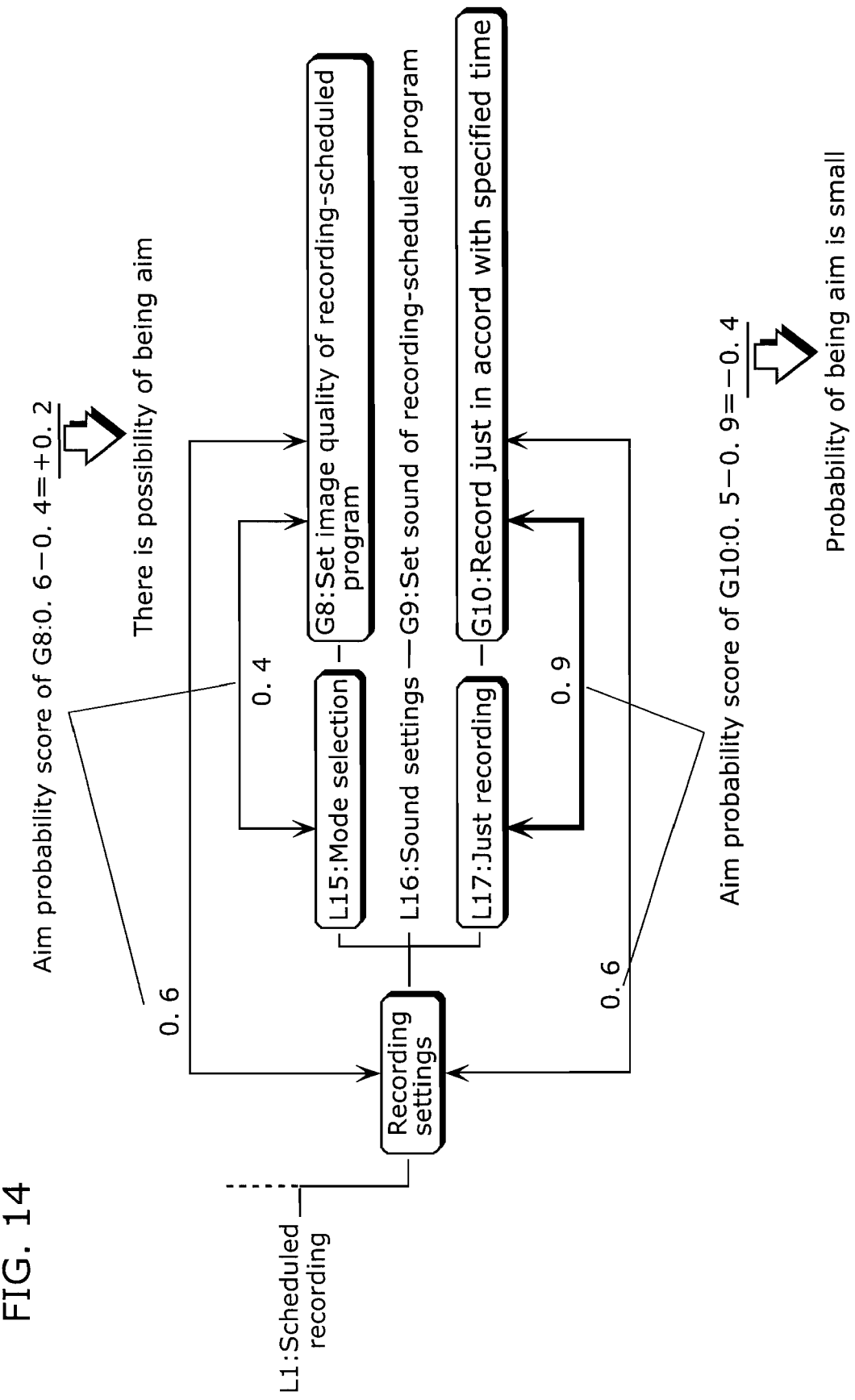
FIG. 14 is a diagram illustrating another example of FIG. 13, which shows a part of the hierarchical structure of the menu screens as shown in FIG. 10.

It is to be noted that in the example described above, the distance between the selected option L5 and the function G8 and the distance between the selected option L5 and the function G10 are both 0.6, but that these distances differ depending on a manner in which the functions are described. FIG. 14 is a diagram illustrating another example of FIG. 13, which shows a part of the hierarchical structure of the menu screens as shown in FIG. 10. Specifically, FIG. 14 shows an example in which the distance between the selected option L5 and the function G8 differs from the distance between the selected option L5 and the function G10.

In the case where an expression (words) that describes the function G10 is "Record just in accord with specified time" as shown in FIG. 14, for example, the word "Setting" has disappeared, and therefore the selected option distance between L5 and G10 is decreased to 0.5, in comparison to FIG. 13. In this case, the aim probability score of G10 is 0.5−0.9=−0.4, and the result of recalculating the estimation score for G10 is a value obtained by adding −0.4α to the score calculated in Step 305 in FIG. 4.

In the above-described process, if the unselected option distance is short with respect to a function that exists subsequent to an unselected option, which has been seen before carrying out the "Back" action, the user would very likely have selected that option if the aim of the user had been that function. In other words, if the function that exists subsequent to the unselected option, which has been seen before carrying out the "Back" action, is semantically close to the unselected option, the user, if he or she had aimed at that function existing subsequent to the unselected option, should have selected the unselected option. Accordingly, when the unselected option distance is short, the probability that the function that exists subsequent to the unselected option is the desired function is decreased. In contrast, when the selected option distance is shorter than the unselected option distance, it is very likely that the user was unable to select the unselected option because the unselected option is inappropriate for the function that exists subsequent to the unselected option. Accordingly, the probability that the function that exists subsequent to the unselected option is the function desired by the user can be increased, thereby enabling the aim estimation score to be calculated so as to reflect the intention of the user to a greater extent.

It is to be noted that, in the example described above, the aim probability score is used to recalculate the estimation score regardless of whether the value of the aim probability score is positive or negative, but the recalculation may be performed only in one of the two cases. For example, in the case where the aim probability score is positive, the value thereof is added to recalculate the estimation score of the function in question in the example described above, but on the ground that the estimation score has been calculated in Step 305 taking the selected option into account, the recalculation thereof using the aim probability score may be omitted, while it is used for the estimation score only when the aim probability score is negative.

It is also to be noted that, in the specific example described above, the option selected immediately before the selection of "Back" is used as the selected option, but a plurality of selected options may be used as such. Specifically, in the example described above, only "Recording settings", which has been selected immediately before the selection of "Back", is used as the selected option, but one or more of the options "Function selection", "Scheduled recording", and "Recording settings" selected before the selection of "Back" may be used to calculate the distance between the selected option and the function. More specifically, it may be so arranged that the distance between each of the alternatives and the function is calculated, the sum thereof is divided by the number of selected options to obtain an average value, and this value is used as the option-function distance. Also, it may be so arranged that one vector is generated from each of the options using the word concept, and a distance between the option and the function is calculated in connection with this vector and used.

Also it is to be noted that, in the specific example described above, the method has been described in which the estimation scores of only the functions that exist subsequent to the unselected options are recalculated, but the estimation scores of all functions may be calculated using the unselected options and the selected option. Specifically, in the case where the estimation score of a function "Search by person name to schedule recording" (hereinafter designated as "G7") as shown in FIG. 10 is recalculated, distances between G7 and each of the unselected options L15, L16, and L17 are first acquired from the option-function distance storage unit 106, and the greatest one of the distances (indicating semantic closeness) is chosen as the unselected option distance. Next, a distance between the selected option L5 and G7 is likewise acquired from the option-function distance storage unit 106, and chosen as the selected option distance. A value of a difference therebetween (i.e., a value obtained by subtracting the unselected option distance from the selected option distance) is used, as the aim probability score, to recalculate the estimation score of G7.

FIG. 15 is a diagram showing an example of the estimation result to be outputted from the estimation unit 114 as shown in FIG. 2 to the operational assistance determination unit 110. An item 1301 is an estimated function rank, and represents an order of the degree of probability of being the function desired by the user; an item 1302 is an estimated function number, representing numbers of the estimated functions; and an item 1303 is an estimated function name, representing function names of the estimated functions. As shown in this figure, as a result of recalculating the estimation scores using the unselected option distances, it has been estimated that G3 has the highest probability of being the desired function, followed by G2 and G1 in that order.

FIG. 16 is a diagram showing an exemplary estimation result obtained in the case where the unselected information-using estimation unit 109 does not recalculate the estimation scores. In this case, because the scores are calculated based on only "recording", "scheduled", and "settings" extracted from the selected options as the words used for the aim estimation, G8, G9, and G10 are ranked high. In contrast, in the case where the estimation scores are recalculated by the unselected information-using estimation unit 109, the estimation scores of G8 to G10 are decreased, with the result that the estimation result as shown in FIG. 15 is obtained, in which G3, which contains "specifying", which is semantically close to "settings", is ranked high.

In Step 307 in FIG. 4, the operational assistance determination unit 110 determines a manner of assisting the user in operating based on the estimation result calculated in Step 306, detailed information concerning the functions and the operational procedures as shown in FIG. 6 stored in the system information storage unit 104, and so on. The operational assistance determination unit 110 presents, to the output unit 111, a screen, an audio, and so on that are required for the determined operational assistance.

Figure 17:
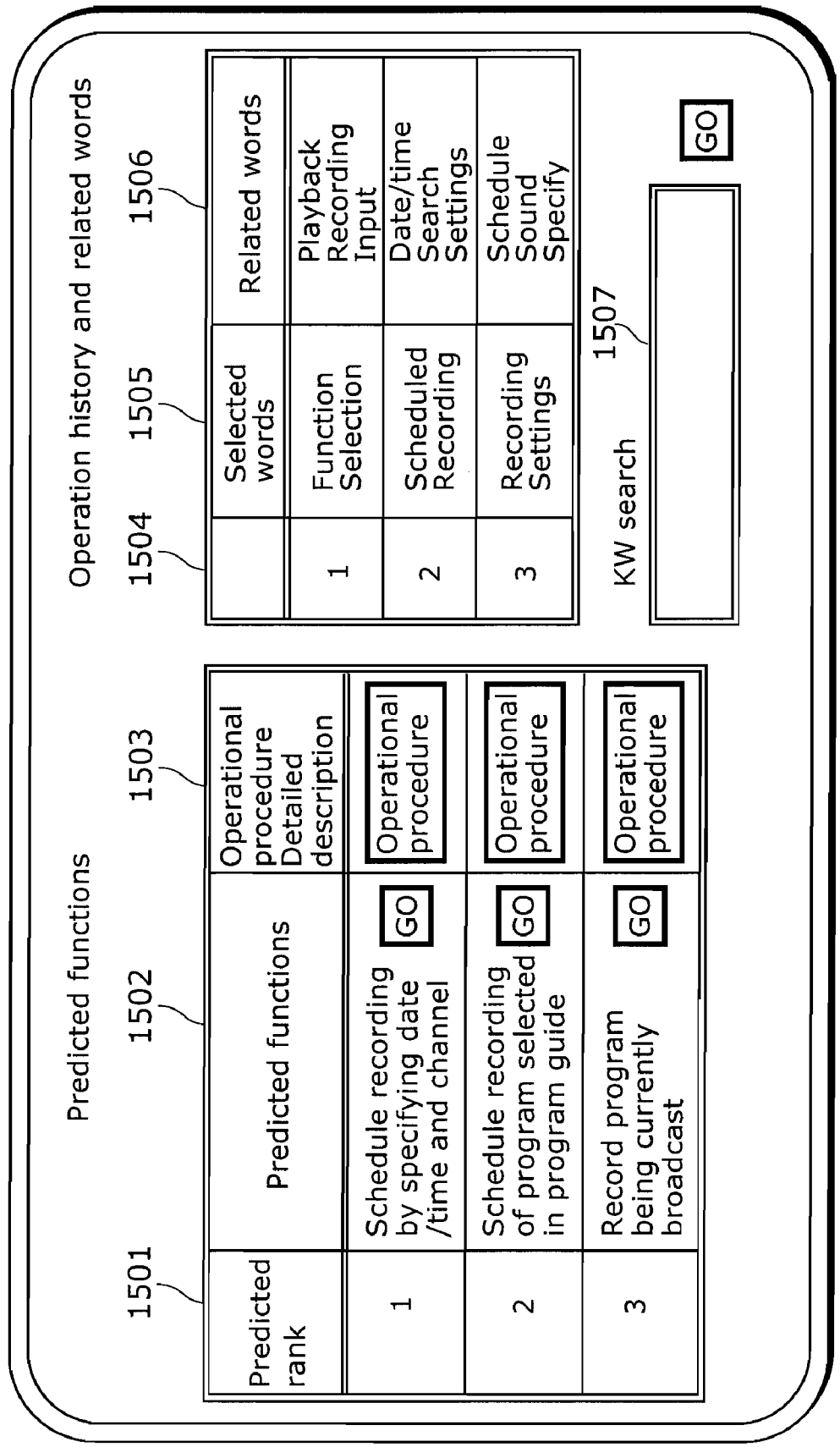
FIG. 17 is a diagram illustrating a specific example of an operational assistance determined by the operational assistance determination unit as shown in FIG. 2.

FIG. 17 is a diagram illustrating a specific example of the operational assistance determined by the operational assistance determination unit 110. An item 1501 is a predicted rank, showing the degree of probability of being the function desired by the user; an item 1502 is a predicted function, showing functions that are prediction results; and an item 1503 is a button for displaying an operational procedure for or a detailed description of the predicted function. An item 1504 is numbers indicating an order of operations selected by the user; an item 1505 is selected words extracted from the selection options which the user has selected until the need for the operational assistance arises; an item 1506 is words that are semantically close to the selected words as shown at the item 1505; and an 1507 is a word entry box for keyword search. As described above, the words that are semantically close to the selected words extracted from the selection options which the user has selected until the need for the operational assistance arises are displayed at the item 1506, whereby the user is able to perform a keyword search more easily by using the related words displayed at the item 1506.

When the function desired by the user is among the predicted functions displayed on this exemplary operational assistance screen, a "GO" button within the item 1502 can be pressed to directly transit to an operation screen therefor. In the case where, instead of a desire for the direct transition, there is a desire to know information concerning the operation, such as the operational procedure, what can be done by this operation, etc., an "Operational procedure" button as shown in the item 1503 can be pressed to know the operational procedure and related information. In addition, the keyword search is also possible in the operational assistance as illustrated in this exemplary operational assistance screen. A keyword may be directly entered in the keyword search-use word entry box at the 1507, but in this exemplary operational assistance, the words extracted from the selection options actually selected by the user are displayed at the item 1505, while at the item 1506 are displayed the words that are semantically close to the words displayed at the item 1505, which are calculated by using the word concept stored in the word concept storage unit 103. When the user selects any of the words displayed at the item 1505 or the item 1506, the word selected is automatically entered in the keyword search-use word entry box. Provision of such an entry interface not only facilitates an operation of entering the keyword, but also enables the user, even when unable to think of a keyword, to perform the keyword search easily owing to the related words being displayed. Moreover, because these related words are calculated using the word semantic vectors on the word concept, the system developer does not need to prepare them for all the words beforehand. It is to be noted that the keyword search may be keyword-matching search using one or more words entered in the 1507, and that a distance between a vector generated by adding up the semantic vectors of the entered words and a function concept vector may be calculated using the inner product.

Processes performed after Step 307 in FIG. 4 are the same as those performed when the user does not need any assistance.

It is to be noted that in the above-described present embodiment, all the option-function distances are calculated beforehand based on the word concept, and the results are stored for subsequent use for the aim estimation, but that necessary option-function distances may be calculated when calculating the aim estimation scores in the estimation unit 114, and also that based on the result of the calculation by the selected information-using estimation unit 108, the functions subjected to the recalculation in the unselected information-using estimation unit 109 may be limited. These ingenuities contribute to obtaining equivalent results with a reduction in required storage capacity or calculation amount.

In the above-described present embodiment, the functions that exist subsequent to the unselected options at the time of the selection of "Back" are handled as the objects of the recalculation of the estimation scores, but a basic concept is taking advantage of a characteristic fact that the functions that are close to the unselected options are unlikely to be the desired function, and all the functions may be the objects of the recalculation.

According to the above-described operation, besides the aim estimation using the options selected by the user, the aim estimation score is recalculated using the difference between the selected option distance and the unselected option distance based on the operation history at the time when the user has selected "Back", and accordingly, the scoring can be achieved with a greater resolution and so as to reflect the intention of the user to a greater extent than when the aim estimation score of each function is calculated simply using only the selected options, and the aim estimation and the operational assistance can be achieved so as to sufficiently reflect the intention of the user in selecting.

Second Embodiment

In the method described in the above-described first embodiment, the estimation score is recalculated using the unselected options at the time when the "Back" action is carried out, so that the aim estimation and the operational assistance can be achieved so as to reflect the intention of the user in selecting to a greater extent.

In this second embodiment, a method of achieving the operational assistance will be described in which unselected options at the time of a general selecting action are additionally used, and in which each time an option is newly selected, the aim probability score is calculated and the estimation score calculated using the selected option is recalculated. It is to be noted that because the recalculation of the estimation score described in this second embodiment is independent of the method of recalculating the estimation score described in the above-described first embodiment, the estimation score may be recalculated using both techniques. The estimation unit 114 in the second embodiment is an example of an estimation unit that, when one of the options is selected in the menu screens, calculates a second selected option distance and a second unselected option distance, and, when a difference between the second selected option distance and the second unselected option distance is negative, decreases, in the estimation, the probability that a corresponding function is the function desired by the user in accordance with an extent of the difference, the second selected option distance being a semantic distance between the selected option and a function positioned at an end of an unselected option that has been displayed on the same menu screen as the selected option but not selected, the second unselected option distance being a semantic distance between the unselected option that has been displayed on the same menu screen as the selected option but not selected and the function positioned at the end. Also, the estimation unit 114 is an example of an estimation unit that further increases, in the estimation, the probability that the corresponding function is the function desired by the user in accordance with the extent of the difference, when the difference between the second selected option distance and the second unselected option distance is positive.

The present embodiment is identical to the above-described first embodiment except in the method of recalculating the estimation score using the unselected information in Step 306 in FIG. 4. Therefore, the description of the present embodiment will focus on this distinction.

Figure 18:
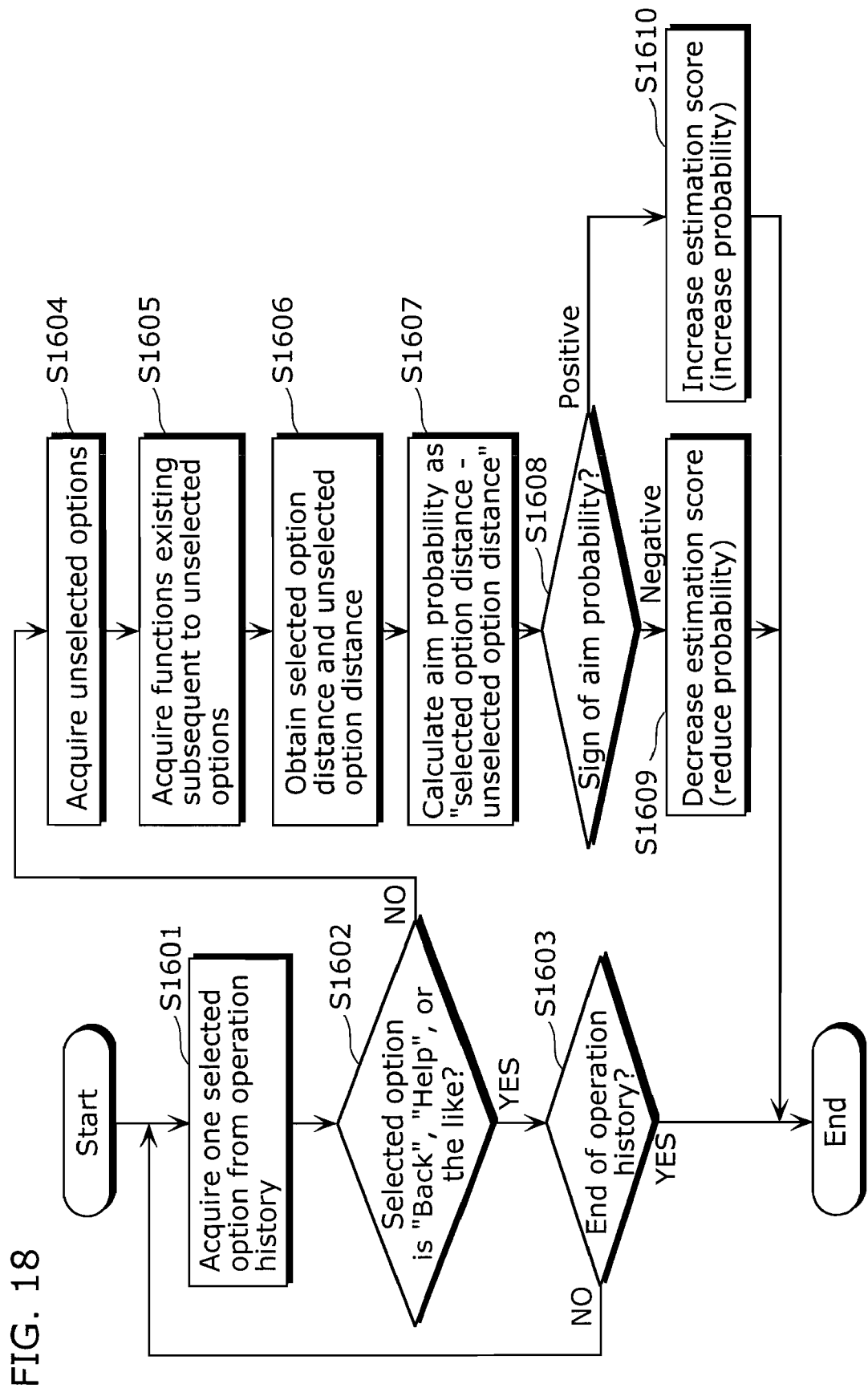
FIG. 18 is a flowchart illustrating a detailed procedure of another example of the process of recalculating the estimation score in Step 306 in FIG. 4.
Figure 19:
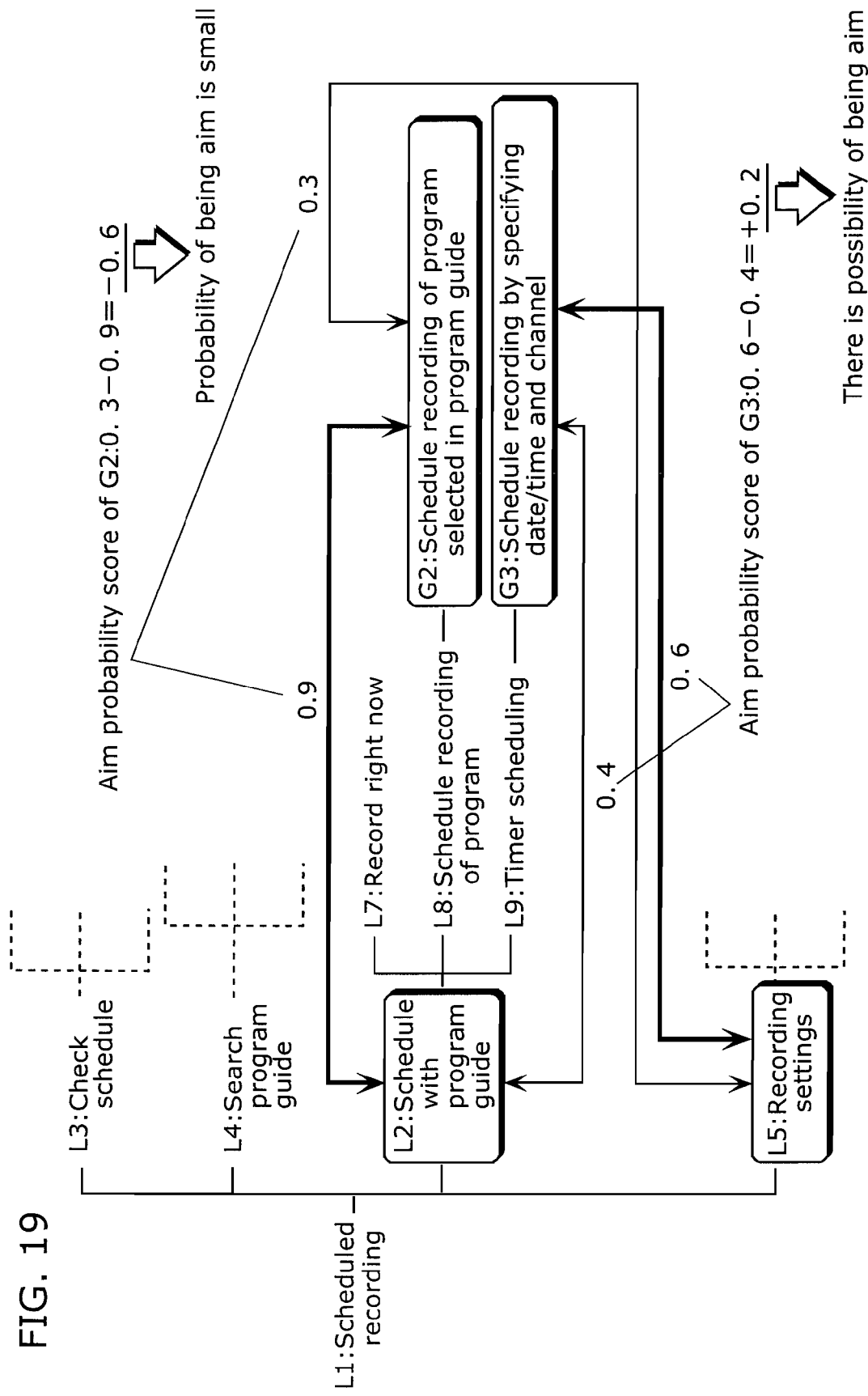
FIG. 19 is a diagram showing a part of the hierarchical structure of the menu screens as shown in FIG. 10.

FIG. 18 is a flowchart illustrating a detailed procedure of another example of the process of recalculating the estimation score in Step 306 in FIG. 4. FIG. 19 is a diagram showing a part of the hierarchical structure of the menu screens as shown in FIG. 10. The process of recalculating the estimation score using the unselected information in Step 306 in FIG. 4 will now be described below with reference to the flowchart of FIG. 18 and FIG. 19, which shows a part of the hierarchical structure as shown in FIG. 10.

In Step 1601, the unselected information-using estimation unit 109 acquires, from the operation history storage unit 107, history information concerning one selected option among the operation history as shown in FIG. 8. In Step 1602, the unselected information-using estimation unit 109 determines whether or not the selected option is an option that is not to be used, as the selected option, for the aim estimation, such as "Back" or "Help". When it is an option that is not to be used, as the selected option, for the aim estimation, control proceeds to YES in Step 1602, i.e., to Step 1603, and it is determined whether or not the next operation history includes a next selected option. When there is any selected option that is yet to be processed, control proceeds to Step 1601, whereas when there is no selected option that is yet to be processed, this procedure is finished. Meanwhile, when it is determined in Step 1602 that the selected option is an option that is to be used for the aim estimation, control proceeds to NO in Step 1602, i.e., to Step 1604. In Step 1604, the unselected options are acquired, and in Step 1605, the functions that exist subsequent to the unselected options are acquired. Specifically, in the case of history No. 3 as shown in FIG. 8, the selected option is "Recording settings" (hereinafter designated as "L5") and the unselected options are "Schedule with program guide", "Check schedule", and "Search program guide" (hereinafter designated as "L2", "L3", and "L4"), and as shown in FIG. 10, the functions that exist subsequent to the unselected options are, in the case of the unselected option L2, for example, "Record program being currently broadcast", "Schedule recording of program selected in program guide", and "Schedule recording by specifying date/time and channel" (hereinafter designated as "G1", "G2", and "G3").

In Step 1606, the distance between the function that exists subsequent to the unselected option and the selected option (hereinafter designated simply as the "selected option distance") and the distance between the function that exists subsequent to the unselected option and the unselected option (hereinafter designated simply as the "unselected option distance") are acquired from the option-function distance storage unit 106.

In Step 1607, the aim probability score is calculated as a value obtained by subtracting the unselected option distance from the selected option distance. As specific examples, the aim probability scores of G2 and G3 when L5 is selected will be described with reference to FIG. 19. Here, numerical values as shown in FIG. 19 represent distances between the options and the functions. As shown in FIG. 19, the unselected option distance between G2 and L2 is 0.9, and the selected option distance between G2 and L5 is 0.3, and therefore the aim probability score of G2 is 0.3−0.9=−0.6. Similarly, the selected option distance between G3 and L5 is 0.6, and the unselected option distance between G3 and L2 is 0.4, and therefore the aim probability score of G3 when L5 is selected is 0.6−0.4=+0.2.

The aim probability scores of the other functions are also calculated using the selected option distance and the unselected option distance.

In Step 1608, a determination is made as to a change in the estimation score based on the aim probability score calculated in Step 1607. When the aim probability score is negative, i.e., when the unselected option distance is greater than the selected option distance, control proceeds to Step 1609, and the estimation score is decreased by a value that is proportional to the absolute value of the aim probability score (that is, the probability of that function being the desired function is reduced). Meanwhile, when the aim probability score is positive, i.e., when the unselected option distance is less than the selected option distance, control proceeds to Step 1610, and the estimation score is increased by a value that is proportional to the absolute value of the aim probability score (that is, the probability of that function being the aim is increased).

Specifically, the aim probability score of G2 is −0.6 as described above, and similarly the aim probability score of G3 is +0.2, and therefore, the result of recalculating the estimation score for G2 is a value obtained by adding −0.6α to the estimation score as calculated in Step 305, and the result of recalculating the estimation score for G3 is a value obtained by adding +0.2α to the estimation score as calculated in Step 305. It is to be noted that α is a positive weighting constant, and it is determined by the designer.

By the above-described process, if, with respect to a function that exists subsequent to an unselected option, the unselected option distance is shorter than the selected option distance, the user would very likely have selected the unselected option if that function had been the function desired by the user, and therefore the probability of its being the desired function is decreased. Conversely, if the selected option distance is shorter than the unselected option distance, it is very likely that the user was unable to select the unselected option because the unselected option is inappropriate for the function that exists subsequent to the unselected option, and therefore the probability of its being the aim can be increased. Thus, the aim estimation score can be calculated so as to reflect the intention of the user to a greater extent.

A description of the processes performed thereafter is omitted because it would be similar to that of the processes performed after Step 307 in FIG. 4 according to the above-described first embodiment.

According to the above-described operation, besides the aim estimation using the options selected by the user, the aim estimation score is recalculated using the difference between the selected option distance and the unselected option distance, and accordingly, the scoring can be achieved with a greater resolution and so as to reflect the intention of the user to a greater extent than when the aim estimation score of each function is calculated simply using the selected options, and the aim estimation and the operational assistance can be achieved so as to sufficiently reflect the intention of the user in selecting.

It is to be noted that while, in the first embodiment and the second embodiment described above, the description of the operation has been made with reference to an exemplary specific case of the operational assistance in a device, the present technique is applicable to all devices and systems that use the selecting-type interface. For example, the present technique is applicable to assistance in searching for a function in a cellular phone having the selecting-type interface, or to assistance in searching for a product or a content on the Internet, for example.

For example, in the case where a user of the cellular phone having the selecting-type interface, who desires to know a telephone number of his or her own cellular phone, sequentially selects selection options but is unable to find a function of displaying his or her own telephone number, the present technique is usable to estimate the desired function with great accuracy based on information about which selected options and which unselected options exist in the operation history. Internet information product sales websites generally have a genre-based hierarchical structure, and in order to reach information about a specific product, it is necessary to select several alternatives such as genre names. In the case where the desired product cannot be reached despite an effort to reach it by sequentially selecting the alternatives, the present technique is usable to estimate the desired product with great accuracy based on information about which selected options and which unselected options exist in the operation history.

It is to be noted that the functional blocks in the block diagrams (FIG. 2 and so on) are typically implemented as an LSI, which is an integrated circuit. They may be formed on a single chip individually, or one chip may include some or all of them. (For example, all functional blocks except for memory may be formed on a single chip.)

While the designation "LSI" has been used above, it may be designated as an IC, a system LSI, a super LSI, or an ultra LSI depending on the degree of integration.

It is also to be noted that the technique for forming the integrated circuit is not limited to the LSI, and a dedicated circuit or a general-purpose processor may be used to accomplish it. Also, an FPGA (Field Programmable Gate Array), which is programmable after production of the LSI, or a reconfigurable processor, which is reconfigurable in settings or connection of circuit cells within the LSI, may be used.

Moreover, if a new technology for forming the integrated circuit, which uses another technology resulting from the progress of or deviation from the semiconductor technology and replaces the LSI, appears, that new technology may naturally be used to accomplish integration of the functional blocks. An application of biotechnology or the like has a potential therefor.

It is also to be noted that all functional blocks, except for a unit for storing data that is to be subjected to encoding or decoding, may be formed on a single chip.

INDUSTRIAL APPLICABILITY

The present invention is applicable to many devices having the selecting-type interface with the hierarchical structure, and has very wide applicability as a technique to provide assistance in performing a desired function or finding a desired content, in devices such as a TV, a cellular phone, and a DVD recorder or in a web page on the Internet.

The invention claimed is:

1. An operation assisting apparatus that estimates a function whose execution is intended by a user based on a history of user operations for selecting an option displayed on a menu screen having a hierarchical structure, and provides an operational assistance based on a result of the estimation, said apparatus comprising:
    an option-function distance storage unit in which a semantic distance indicating a degree of a relation between each of the options displayed on the menu screen and each of a plurality functions positioned at an end in the hierarchical structure of the menu screen is stored;
    an estimation unit configured to estimate a probability that each of the functions is the function desired by the user, based on: a semantic distance between a word that describes characteristics of a selection option selected by the user and a word that characterizes each of the functions; and a semantic distance between a word that describes characteristics of an unselected selection option that has been selectable but not selected and a word that characterizes each of the functions; and
    an operational assistance determination unit configured to determine, based on the result of the estimation, a detail of an output for the operational assistance such that functions with higher probability are more likely to be selected.

2. The operation assisting apparatus according to claim 1, further comprising
    an operation history storage unit in which information is stored, the information concerning the history of the user operations for sequentially selecting the options,
    wherein the semantic distance is defined to have a greater value as the word that describes characteristics of the option is semantically closer to the word that characterizes the function, and
    when a "Back" process is performed on the menu screen for returning to a menu screen on a level immediately above in the hierarchical structure, said estimation unit is configured: to calculate a first selected option distance and a first unselected option distance; and to decrease, in the estimation, the probability that a corresponding function is the function desired by the user in accordance with a difference between the first selected option distance and the first unselected option distance in the case where the difference is negative, the first selected option distance being a semantic distance between the word that describes characteristics of a selected option on the menu screen that is at least immediately previous to the performance of the "Back" process and the word that characterizes a function positioned at an end of the selected option, the first unselected option distance being a semantic distance between the word that describes characteristics of an unselected option on a menu screen on which the "Back" process has been performed and the word that characterizes a function positioned at the end.

3. The operation assisting apparatus according to claim 2, wherein, said estimation unit is further configured to increase, in the estimation, the probability that the corresponding function is the function desired by the user in accordance with a difference between the first selected option distance and the first unselected option distance in the case where the difference is positive.

4. The operation assisting apparatus according to claim 1, further comprising
    an operation history storage unit in which information is stored, the information concerning the history of the user operations for sequentially selecting the options,
    wherein, when one of the options is selected on the menu screens, said estimation unit is configured: to calculate a second selected option distance and a second unselected option distance; and to decrease, in the estimation, the probability that a corresponding function is the function desired by the user in accordance with a difference between the second selected option distance and the second unselected option distance in the case where the difference is negative, the second selected option distance being a semantic distance between the word that describes characteristics of the selected option and the word that characterizes each of the functions positioned at an end of an unselected option that has been displayed on the same menu screen as the selected option but not selected, the second unselected option distance being a semantic distance between the word that describes characteristics of the unselected option that has been displayed on the same menu screen as the selected option but not selected and the word that characterizes each of the functions positioned at the end.

5. The operation assisting apparatus according to claim 4, wherein, said estimation unit is further configured to increase, in the estimation, the probability that the corresponding function is the function desired by the user in accordance with a difference between the second selected option distance and the second unselected option distance in the case where the difference is positive.

6. The operation assisting apparatus according to claim 1, further comprising
    a control unit configured to output a detail for the operational assistance determined by said operational assistance determination unit when detecting: that a Help button is pressed; that a predetermined time has passed without any operation being performed since an option previous to any of the functions at the ends in the hierarchical structure has been selected; or a specific pattern of user operations.

7. An operation assisting method for estimating a function whose execution is intended by a user based on a history of user operations for selecting an option displayed on a menu screen having a hierarchical structure, and providing an operational assistance based on a result of the estimation, said method comprising:
    storing a semantic distance indicating a degree of a relation between each of the options displayed on the menu screen and each of a plurality of functions positioned at an end in the hierarchical structure of the menu screen;
    estimating a probability that each of the functions is the function desired by the user, based on: a semantic distance between a word that describes characteristics of a selection option selected by the user and a word that characterizes each of the functions; and a semantic distance between a word that describes characteristics of an unselected selection option that has been selectable but not selected and a word that characterizes each of the functions; and
    determining, based on the result of the estimation, a detail of an output for the operational assistance such that functions with higher probability are more likely to be selected.

8. A recording apparatus that has an operation assisting function that estimates a function of said recording apparatus whose execution is intended by a user based on a history of user operations for selecting an option, displayed on a menu screen having a hierarchical structure, of the function of said recording apparatus, and provides an operational assistance based on a result of the estimation, said recording apparatus comprising:

an option-function distance storage unit in which a semantic distance indicating a degree of a relation between each of the options displayed on the menu screen and each of a plurality of functions of said recording apparatus is stored, the each of the plurality of functions positioned at an end in the hierarchical structure of the menu screen;

an estimation unit configured to estimate a probability that each of the functions is the function desired by the user, based on: a semantic distance between a word that describes characteristics of a selection option selected by the user and a word that characterizes each of the functions; and a semantic distance between a word that describes characteristics of an unselected selection option that has been selectable but not selected and a word that characterizes each of the functions; and an operational assistance determination unit configured to determine, based on the result of the estimation, a detail of an output for the operational assistance such that functions with higher probability are more likely to be selected.

9. A mobile terminal that has an operation assisting function that estimates a function whose execution is intended by a user based on a history of user operations for selecting an option, displayed on a menu screen having a hierarchical structure, of the function of said mobile terminal, and provides an operational assistance based on a result of the estimation, said mobile terminal comprising:

an option-function distance storage unit in which a semantic distance indicating a degree of a relation between each of the options displayed on the menu screen and each of a plurality of functions of said mobile terminal is stored, the each of the plurality of functions positioned at an end in the hierarchical structure of the menu screen;

an estimation unit configured to estimate a probability that each of the functions is the function desired by the user, based on: a semantic distance between a word that describes characteristics of a selection option selected by the user and a word that characterizes each of the functions; and a semantic distance between a word that describes characteristics of an unselected selection option that has been selectable but not selected and a word that characterizes each of the functions; and an operational assistance determination unit configured to determine, based on the result of the estimation, a detail of an output for the operational assistance such that functions with higher probability are more likely to be selected.

10. A non-transitory computer readable recording medium on which a program is stored, the program allowing a computer to execute an operation assisting function that estimates a function whose execution is intended by a user based on a history of user operations for selecting an option displayed on a menu screen having a hierarchical structure, and provides an operational assistance based on a result of the estimation, the program causing a computer to execute:

storing a semantic distance indicating a degree of a relation between each of the options displayed on the menu screen and each of a plurality of functions positioned at an end in the hierarchical structure of the menu screen;

estimating a probability that each of the functions is the function desired by the user, based on: a semantic distance between a word that describes characteristics of a selection option selected by the user and a word that characterizes each of the functions; and a semantic distance between a word that describes characteristics of an unselected selection option that has been selectable but not selected and a word that characterizes each of the functions; and determining, based on the result of the estimation, a detail of an output for the operational assistance such that functions with higher probability are more likely to be selected.

\* \* \* \* \*